US012162097B2

(12) United States Patent
Metz et al.

(10) Patent No.: US 12,162,097 B2
(45) Date of Patent: Dec. 10, 2024

(54) WORKPIECE POSITIONER ASSEMBLY HAVING COMPLIANCE ASSEMBLIES

(71) Applicant: YASKAWA AMERICA INC., Waukegan, IL (US)

(72) Inventors: Donald J. Metz, North Hampton, OH (US); Alberto H. Gay, Washington Township, OH (US); Carl S. Wiener, Yellow Springs, OH (US)

(73) Assignee: YASKAWA AMERICA, INC., Waukegan, IL (US)

( * ) Notice: Subject to any disclaimer, the term of this patent is extended or adjusted under 35 U.S.C. 154(b) by 341 days.

(21) Appl. No.: 17/585,475

(22) Filed: Jan. 26, 2022

(65) Prior Publication Data

US 2022/0234148 A1 Jul. 28, 2022

Related U.S. Application Data

(60) Provisional application No. 63/142,651, filed on Jan. 28, 2021.

(51) Int. Cl.
*B23Q 1/00* (2006.01)
*B23K 37/04* (2006.01)
*B25J 9/00* (2006.01)

(52) U.S. Cl.
CPC ......... *B23K 37/0426* (2013.01); *B25J 9/0096* (2013.01)

(58) Field of Classification Search
CPC .... B23K 37/04; B23K 26/08; B23K 37/0452; B23Q 1/03; B23Q 1/5437; B23Q 1/525
See application file for complete search history.

(56) References Cited

U.S. PATENT DOCUMENTS 2,445,016 A * 7/1948 Bentley .............. B23K 37/0461
269/61
4,666,363 A 5/1987 Johansson
(Continued)

FOREIGN PATENT DOCUMENTS

EP 3219436 9/2017

OTHER PUBLICATIONS

International Search Report for corresponding International Application No. PCT/US22/13951, Apr. 13, 2022.

*Primary Examiner* — Lee D Wilson
(74) *Attorney, Agent, or Firm* — MORI & WARD, LLP

(57) ABSTRACT

A workpiece positioner assembly including a headstock apparatus having a motor and a headstock swing arm rotatably supported on the headstock apparatus. The headstock swing arm is configured to be rotated by the motor. The assembly includes a tailstock apparatus and a tailstock swing arm rotatably supported on the tailstock apparatus. The tailstock swing arm and the headstock swing arm are configured to support a workpiece. The assembly also includes a beam coupled to the headstock swing arm and to the tailstock swing arm to transmit rotation of the headstock swing arm to the tailstock swing arm, and a compliance assembly. The compliance assembly is provided between at least one of the headstock swing arm and the beam to enable relative movement between the headstock swing arm and the beam, and the tailstock swing arm and the beam to enable relative movement between the tailstock swing arm and the beam.

20 Claims, 19 Drawing Sheets

(56) References Cited

U.S. PATENT DOCUMENTS

| | | | | |
|---|---|---|---|---|
| 5,658,476 | A * | 8/1997 | Gullo | B23K 26/706 219/121.82 |
| 6,281,474 | B1 | 8/2001 | Michael et al. | |
| 7,172,376 | B1 | 2/2007 | Jagtap et al. | |
| 7,434,491 | B1 | 10/2008 | Sutton, Jr. et al. | |
| 10,493,572 | B2 * | 12/2019 | Roling | B23K 37/047 |
| 2006/0242818 | A1 * | 11/2006 | Penick | B25J 9/04 29/560 |
| 2011/0031298 | A1 | 2/2011 | Simmons | |
| 2014/0015181 | A1 * | 1/2014 | Murphy | B23K 37/0452 29/559 |
| 2016/0129535 | A1 * | 5/2016 | Mabee | B23Q 1/525 29/559 |
| 2022/0234148 | A1 * | 7/2022 | Metz | B23K 37/0426 |

* cited by examiner

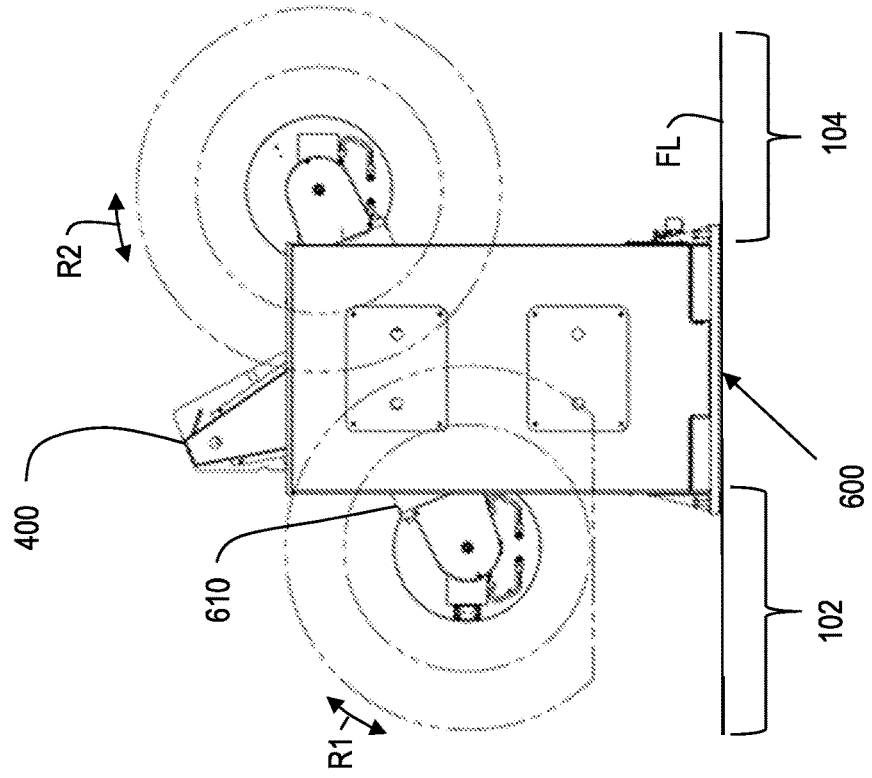
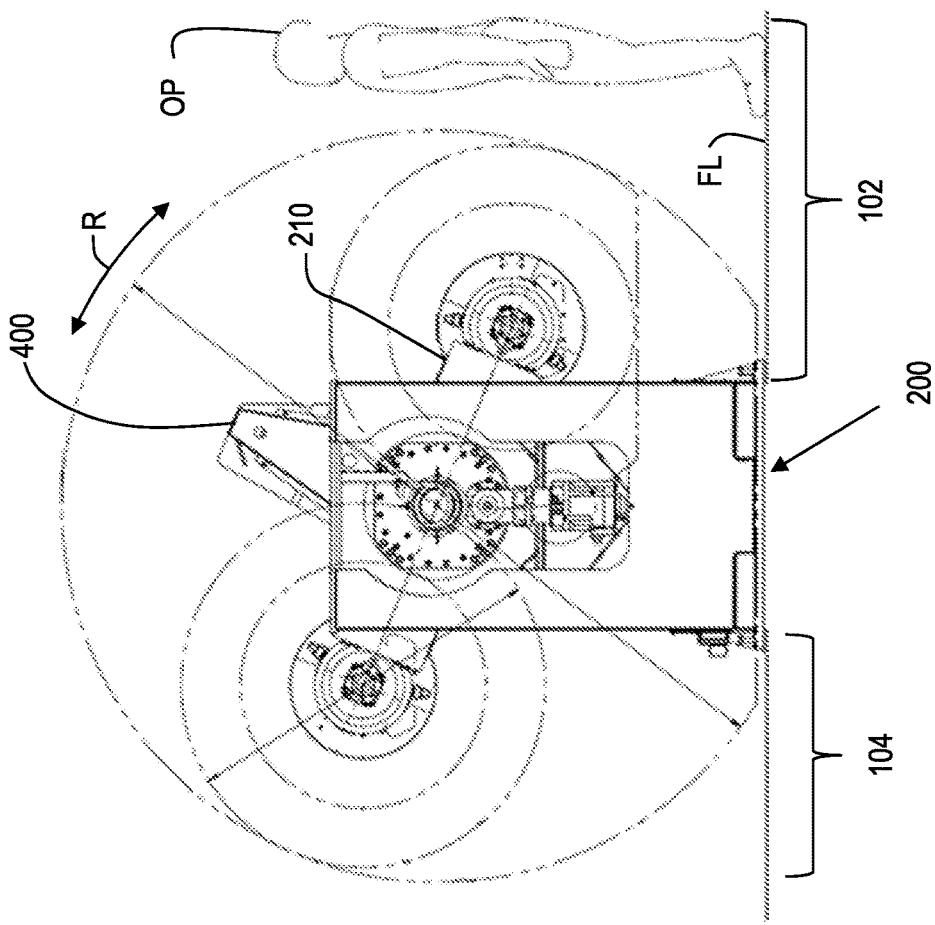

WORKPIECE POSITIONER ASSEMBLY HAVING COMPLIANCE ASSEMBLIES

CROSS-REFERENCE TO RELATED APPLICATION

The present application claims priority to U.S. Provisional Application No. 63/142,651, filed on Jan. 28, 2021, the entire contents of which are herein incorporated by reference.

BACKGROUND OF THE INVENTION

Field of the Invention

The present invention relates to a workpiece manipulator or positioner. The positioner may be utilized to position successive workpieces relative to industrial robot(s) for processing by the robot(s), or a tool(s) held by the robot(s).

Discussion of the Background

Industries often employ industrial robots for a variety of applications in the course of manufacturing. While many industrial robot arms are able to function on several rotational axes, manufacturing efficiency can be improved by employing a manipulator or positioner in cooperation with the robot arm. The positioner can be utilized to position an otherwise static series of workpieces relative to the industrial robot such that the workpieces, one after the other, may be processed. The positioner also helps optimize the process and throughput.

However, when using a positioner in a fixed headstock/tailstock configuration, the centerlines of the headstock and tailstock faceplates typically need to be in proper alignment. Misalignment can create headstock bearing loads and rotational drag, stalling and/or premature failure causing damage to the drive assembly and, therefore, increasing costs. Other problems caused by misalignment of the assembly include shearing of the tooling from the positioner and/or distortion of the workpiece.

The present inventors have recognized a need for improvements in the robotic headstock/tailstock positioner design.

SUMMARY OF THE INVENTION

The present invention advantageously provides a workpiece positioner assembly including a headstock apparatus having a motor and a headstock swing arm rotatably supported on the headstock apparatus. The headstock swing arm is configured to be rotated by the motor. The workpiece positioner assembly further includes a tailstock apparatus and a tailstock swing arm rotatably supported on the tailstock apparatus. The tailstock swing arm and the headstock swing arm are configured to support a workpiece. The workpiece positioner assembly also includes a beam coupled to the headstock swing arm and to the tailstock swing arm to transmit rotation of the headstock swing arm to the tailstock swing arm, and a compliance assembly. The compliance assembly is provided between at least one of the headstock swing arm and the beam to enable relative movement between the headstock swing arm and the beam, and the tailstock swing arm and the beam to enable relative movement between the tailstock swing arm and the beam.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 4A is a left side view of the workpiece positioner assembly of FIG. 1;

FIG. 4B is a right side view of the workpiece positioner assembly of FIG. 1;

DETAILED DESCRIPTION OF EXEMPLARY EMBODIMENTS OF THE INVENTION

Figure 1:
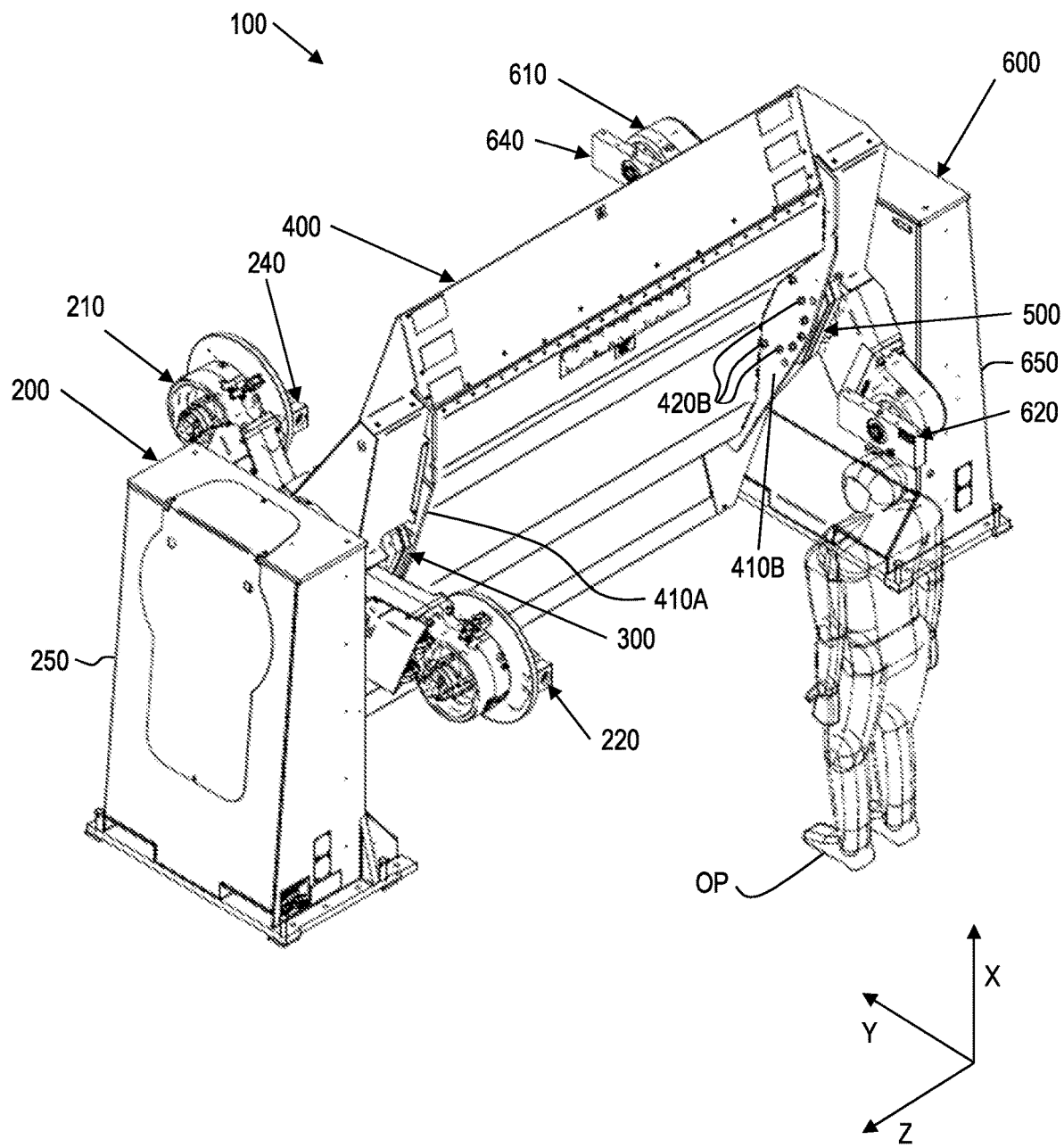
FIG. 1 is a top, front, left perspective view of a workpiece positioner assembly according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The present invention relates to headstock/tailstock positioners and, more particularly, to a flexible interface for headstock/tailstock positioners that can be employed in combination with industrial robot(s).

A workpiece positioner assembly 100 comprises a headstock apparatus 200 that is configured to rotate a workpiece in conjunction with a tailstock apparatus 600. The headstock apparatus 200 (see, e.g., FIGS. 1-4B and 10-14) includes a headstock swing arm 210 and a base (or pedestal) 250. The headstock swing arm 210 supports a first headstock workpiece mounting module 220 and a second headstock workpiece mounting module 240. The headstock swing arm 210 is rotatably supported on the base 250 of the headstock apparatus 200. The tailstock apparatus 600 (see, e.g., FIGS. 1-9) includes a tailstock swing arm 610 and a base (or pedestal) 650. The tailstock swing arm 610 supports a first tailstock workpiece mounting module 620 and a second tailstock workpiece mounting module 640. The tailstock swing arm 610 is rotatably supported on the base 650 of the tailstock apparatus 600.

The workpiece positioner assembly 100 of the present embodiment further comprises a headstock compliance assembly (or first compliance assembly) 300, a center beam (or beam) 400, and a tailstock compliance assembly (or second compliance assembly) 500. The headstock compliance assembly 300 is provided between the headstock swing arm 210 and the beam 400 to enable relative movement between the headstock swing arm 210 and the beam 400. The tailstock compliance assembly 500 is provided between the tailstock swing arm 610 and the beam 400 to enable relative movement between the tailstock swing arm 610 and the beam 400.

The headstock compliance assembly 300, which enables pitch and yaw and axial movement relative to the headstock swing arm 210, is installed between the swing arm 210 and the center beam 400. The center beam 400 is attached to the tailstock compliance assembly 500, again enabling pitch and yaw movement relative to a tailstock swing arm 610. The tailstock swing arm 610 is rotatably supported on the base 650 of a tailstock apparatus 600. Compliance assemblies 300, 500 used in this manner allow the center beam 400 to be primarily a torque transmission component and not a vertical load or moment supporting member, this is true for all lengths of center beams.

The headstock apparatus 200 includes an electrically powered drive assembly (or headstock positioner)(shown in FIG. 13), which is configured to "position" or rotate the otherwise static workpiece, in cooperation with the tailstock apparatus 600, relative to one or more industrial robotic arms for more effective processing of workpieces during manufacturing. Thus, the device comprising the workpiece positioner assembly 100 can further comprise one or more industrial robots RB. The center beam 400 transmits rotation of the headstock swing arm 200, which is driven by a drive assembly of the headstock apparatus 200, to the tailstock swing arm 610, which is rotatably supported by the tailstock apparatus 600.

The center beam 400 also acts as a shield to separate a robot side 104 (or more generally workpiece processing (e.g., welding) side) of the workpiece positioner assembly 100 from an operator side 102. (See, e.g., FIG. 3, 4A, 4B, etc.) An operator stands OP on the operator side 102 to load a workpiece or workpieces between a first headstock workpiece mounting module 220 and a first tailstock workpiece mounting module 620, when in the orientation shown in FIGS. 1 and 3. The workpiece W1 can extend from the first headstock workpiece mounting module 220 to the first tailstock workpiece mounting module 620, or the workpiece(s) can be mounted to a workpiece mount that extends from the first headstock workpiece mounting module 220 to the first tailstock workpiece mounting module 620. The operator OP can then control the workpiece positioner assembly 100 such that the headstock swing arm 210, the center beam 400, and the tailstock swing arm 610 rotate in a rotational direction R such that the first headstock workpiece mounting module 220 and the first tailstock workpiece mounting module 620 move from their positions shown in FIG. 1 on the operator side 102 to the positions of a second headstock workpiece mounting module 240 and a second tailstock workpiece mounting module 640 shown in FIG. 1 on the robot side 104. Thus, due to this rotation, the first headstock workpiece mounting module 220 and the first tailstock workpiece mounting module 620 move from the operator side 102 to the robot side 104, so that the robot(s) RB on the robot side 104 can work on the workpiece(s) W1. This rotation conversely moves the second headstock workpiece mounting module 240 and the second tailstock workpiece mounting module 640 from the robot side 104 to the operator side 102, so that the operator can unload any workpiece(s) W2 on the second headstock workpiece mounting module 240 and the second tailstock workpiece mounting module 640 and load any new workpiece(s) thereon. After the robot(s) RB has completed the work on the workpiece(s) W1 on the first headstock workpiece mounting module 220 and the first tailstock workpiece mounting module 620, and after the operator OP has completed unloading/loading of workpiece(s) W2 on the second headstock workpiece mounting module 240 and the second tailstock workpiece mounting module 640, then the operator OP can control the workpiece positioner assembly 100 such that the headstock swing arm 210, the center beam 400, and the tailstock swing arm 610 rotate in the rotational direction R either in the same rotational direction as during the previous rotation (e.g., +R direction, if previous rotation was +R direction) or in an opposite rotational direction (e.g., −R direction, if previous rotation was +R direction). (See, e.g., U.S. Pat. Nos. 6,281,474 and 7,434,491, which are incorporated herein in their entirety, for additional background/reference information.)

It is noted that the first headstock workpiece mounting module 220 and the first tailstock workpiece mounting module 620 can rotate in a rotational direction R1 in order to position the workpiece(s) W1 supported thereon in order to facilitate load, work processing, and unloading of the workpiece(s) W1. It is further noted that the second headstock workpiece mounting module 240 and the second tailstock workpiece mounting module 640 can rotate in a rotational direction R2 in order to position the workpiece(s) W2 supported thereon in order to facilitate load, work processing, and unloading of the workpiece(s) W2.

Figure 3:
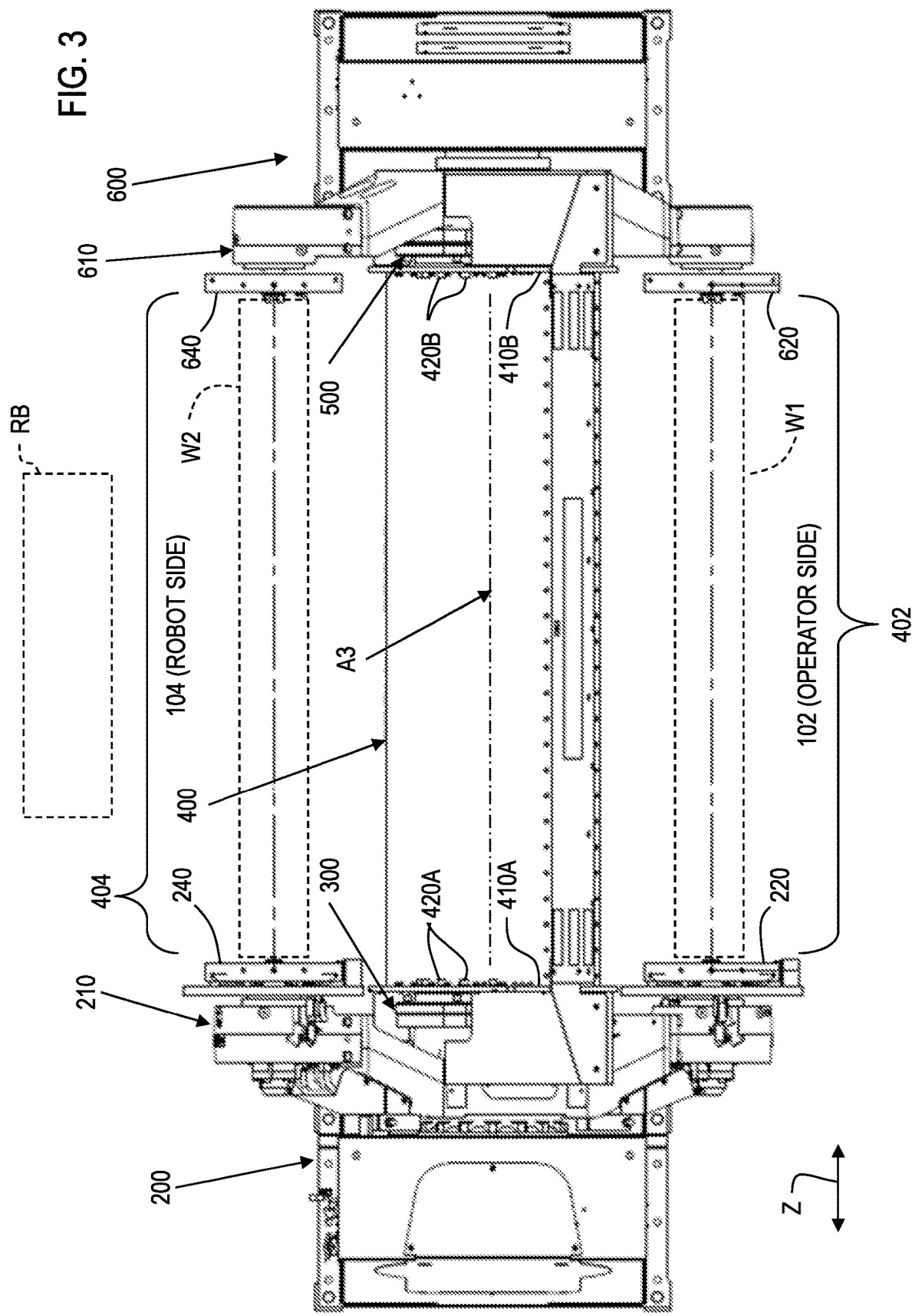
FIG. 3 is a top view of the workpiece positioner assembly of FIG. 1.
Figure 5:
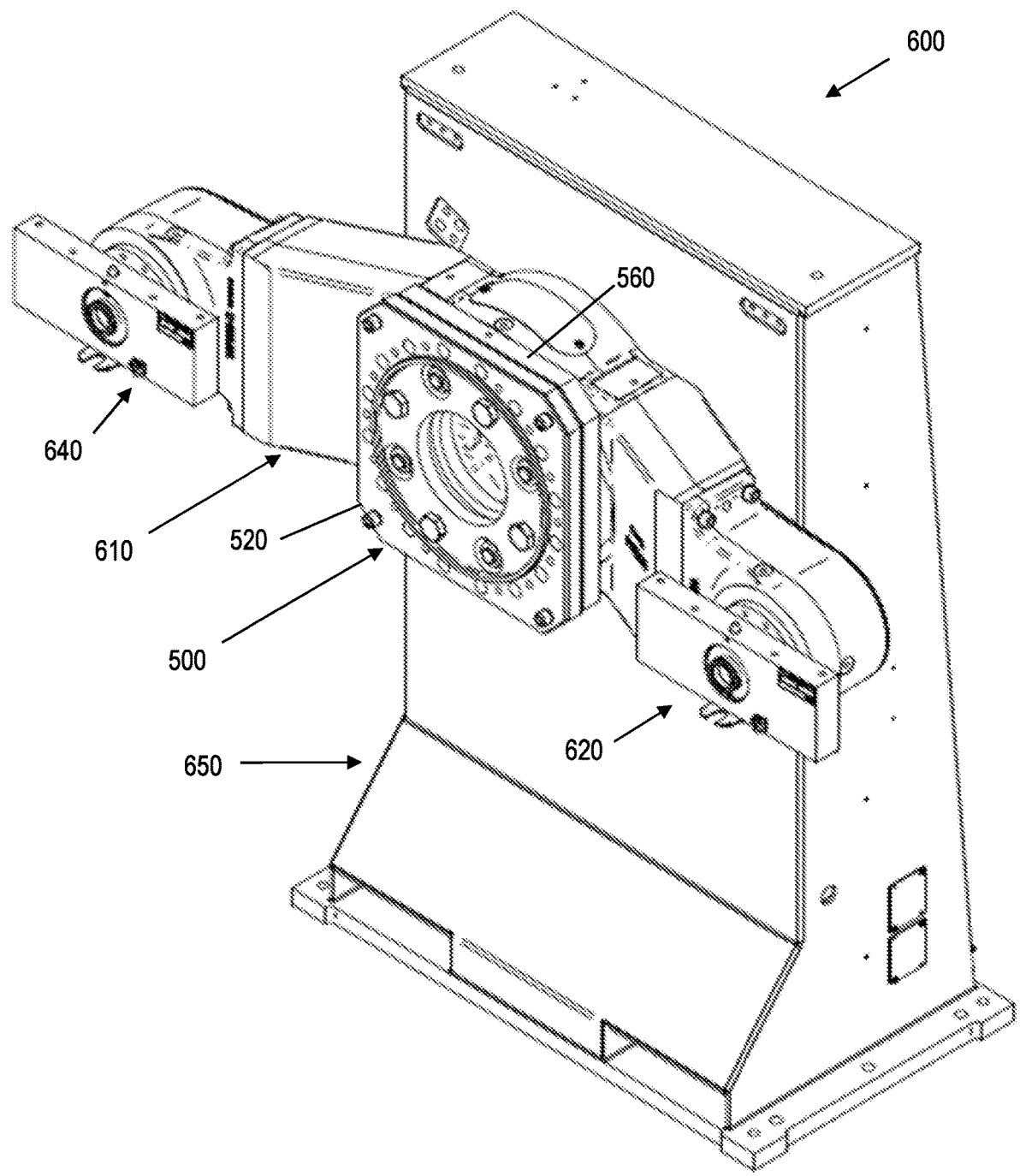
FIG. 5 is a top, front, left perspective view of a tailstock apparatus and a compliance assembly of the workpiece positioner assembly of FIG. 1.
Figure 6:
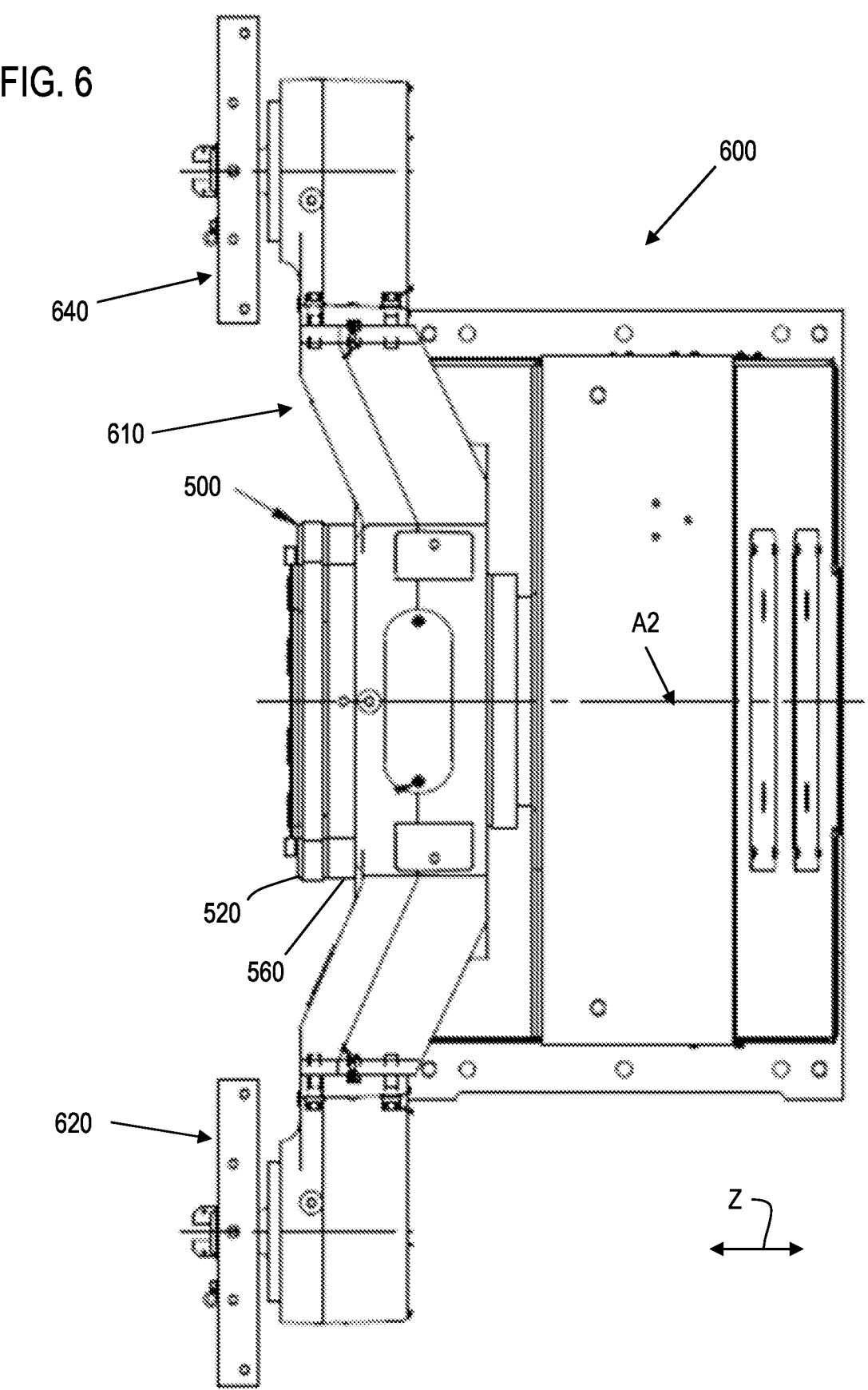
FIG. 6 is a top view of the tailstock apparatus and the compliance assembly of the workpiece positioner assembly of FIG. 1.
Figure 7:
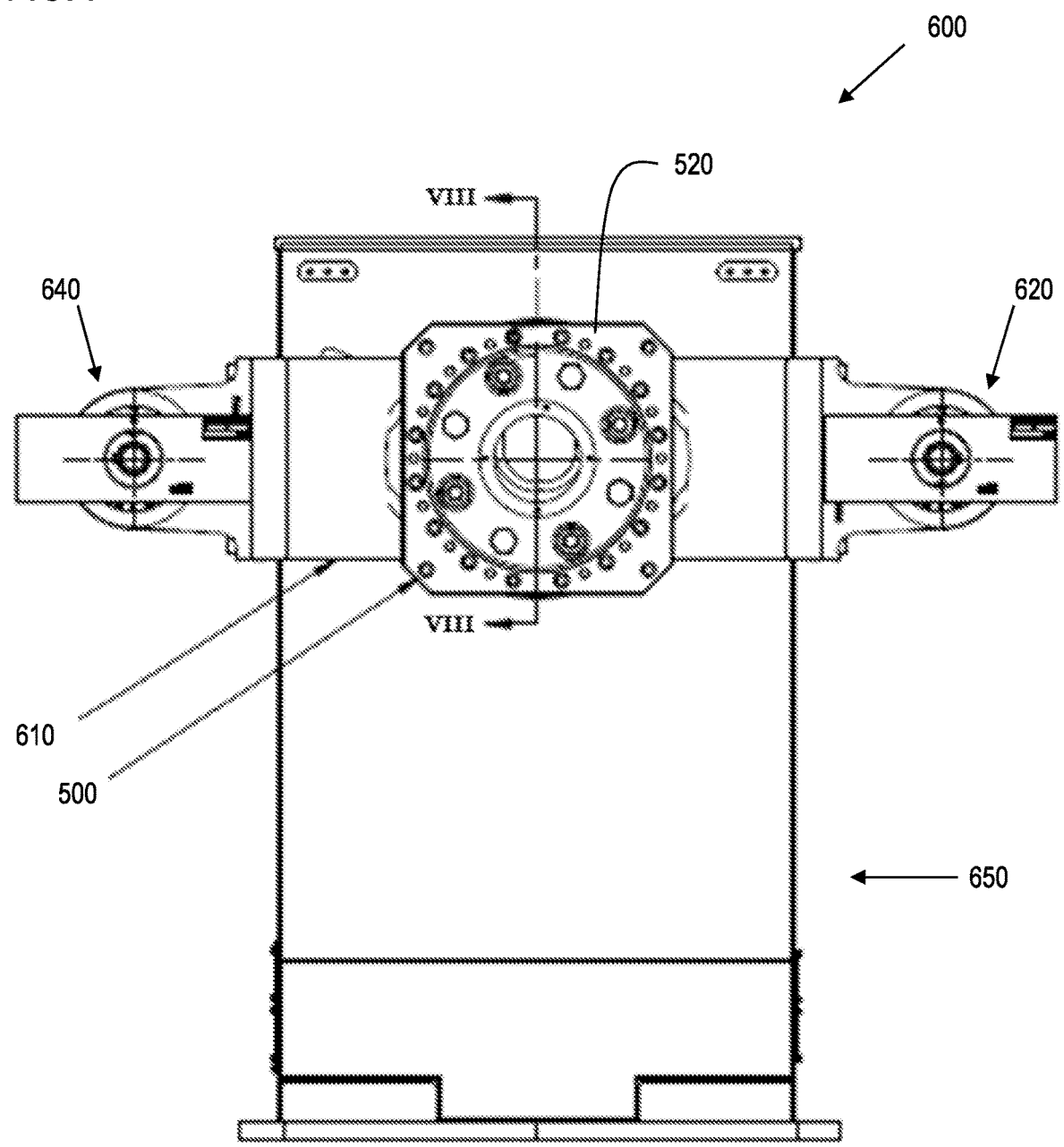
FIG. 7 is a left side view of the tailstock apparatus and the compliance assembly of the workpiece positioner assembly of FIG. 1.

The center beam 400 is configured as a shield to separate a first area 402 between the first headstock workpiece mounting module 220 and the first tailstock workpiece mounting module 620 from a second area 404 between the second headstock workpiece mounting module 240 and the second tailstock workpiece mounting module 640. (See, e.g., FIG. 3.) As the headstock swing arm 200, the center beam 400, and the tailstock apparatus 600 rotate together, the first area 402 and the second area 404 can be rotated between the operator side 102 at which workpieces are loaded and unloaded (and/or worked by an operator) and the robot side 104 at which a robot works the workpieces. The workpiece(s) W1 are supported between the first headstock workpiece mounting module 220 and the first tailstock workpiece mounting module 620 in the first area 402, and the workpiece(s) W2 are supported between the second headstock workpiece mounting module 240 and the second tailstock workpiece mounting module 640 in the second area 404, as shown in FIG. 3.

The headstock swing arm 210 has a first axis of rotation A1 as rotatably supported by the headstock apparatus 200. The first axis of rotation A1 extends along the Z axis. The tailstock swing arm 610 has a second axis of rotation A2 as rotatably supported by the tailstock apparatus 600. However, the headstock apparatus 200 (e.g., at a bottom of base or pedestal 250) and the tailstock apparatus 600 (e.g., at a bottom of base or pedestal 650) is be mounted to a floor FL such that the first axis of rotation A1 is not precisely aligned with the second axis of rotation A2 (e.g., the first axis of rotation and second axis of rotation are parallel but offset from one another, or the first axis of rotation and second axis of rotation are at an angle with respect to one another (i.e. not parallel)). Thus, the center beam 400 has a third axis (or longitudinal axis) A3 that is not aligned with one or both of the first axis of rotation A1 and the second axis of rotation A2. The first compliance assembly 300 and the second compliance assembly 500 allow for the center beam 400 to be used to transmit torque from the headstock apparatus 200 to the tailstock apparatus 600 with such misaligned axes of rotation by providing a first flexible coupling via the first compliance assembly 300 between the headstock swing arm 210 (or the driving shaft of the headstock apparatus 200 rotating the headstock swing arm 210) and the center beam 400 and a second flexible coupling via the second compliance assembly 500 between the center beam 400 and the tailstock swing arm 610 (or the supporting (or driven)) shaft of the tailstock apparatus 600 rotating the tailstock swing arm 610).

Thus, the first compliance assembly 300 is provided between the headstock swing arm 210 and the beam 400 to enable relative movement including flexing pitch movement (i.e. rotation about Y axis as seen in FIG. 1), flexing yaw movement (i.e., rotation about X axis as seen in FIG. 1), and flexing axial movements (i.e., translation along Z axis as seen in FIG. 1) relative to the first axis of rotation A1 of the headstock swing arm 210, and the second compliance assembly 500 is provided between the tailstock swing arm 610 and the beam 400 to enable relative movement including flexing pitch movement (i.e. rotation about Y axis as seen in FIG. 1), flexing yaw movement (i.e., rotation about X axis as seen in FIG. 1), and flexing axial movements (i.e., translation along Z axis as seen in FIG. 1) relative to the second axis of rotation A2 of the tailstock swing arm 610. The compliance assembly 300 provides stiff torque transmission from the headstock swing arm 210 to the tailstock swing arm 610 via the beam 400 by enabling relative movement between the longitudinal axis A3 and the first axis of rotation A1. The compliance assembly 500 provides stiff torque transmission from the headstock swing arm 210 to the tailstock swing arm 610 via the beam 400 by enabling relative movement between the longitudinal axis A3 and the second axis of rotation A2.

Figure 13:
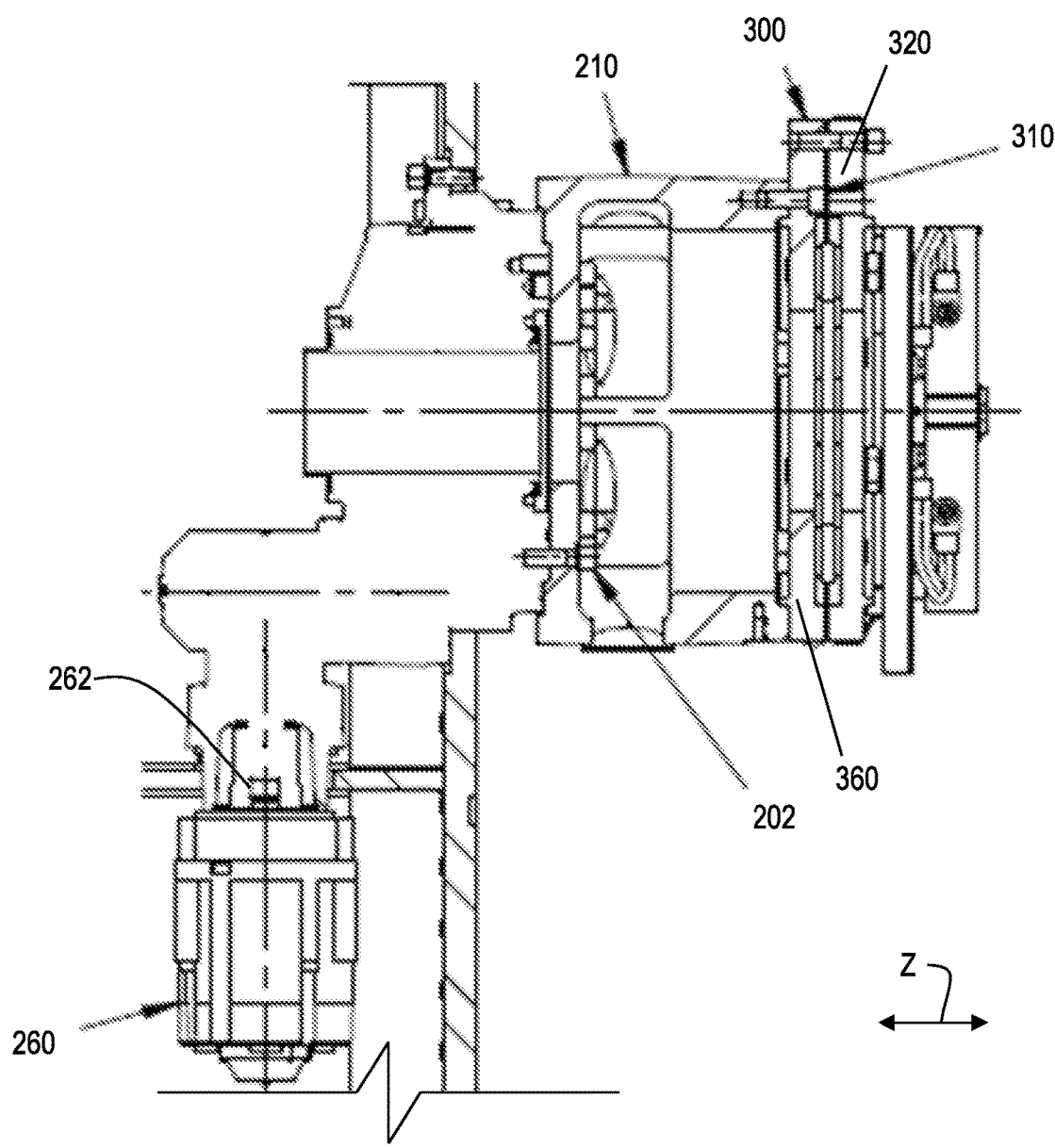
FIG. 13 is a partial cross-section view and partial schematic view of a drive assembly of the headstock apparatus and the compliance assembly taken along line XIII-XIII in FIG. 12.
Figure 14:
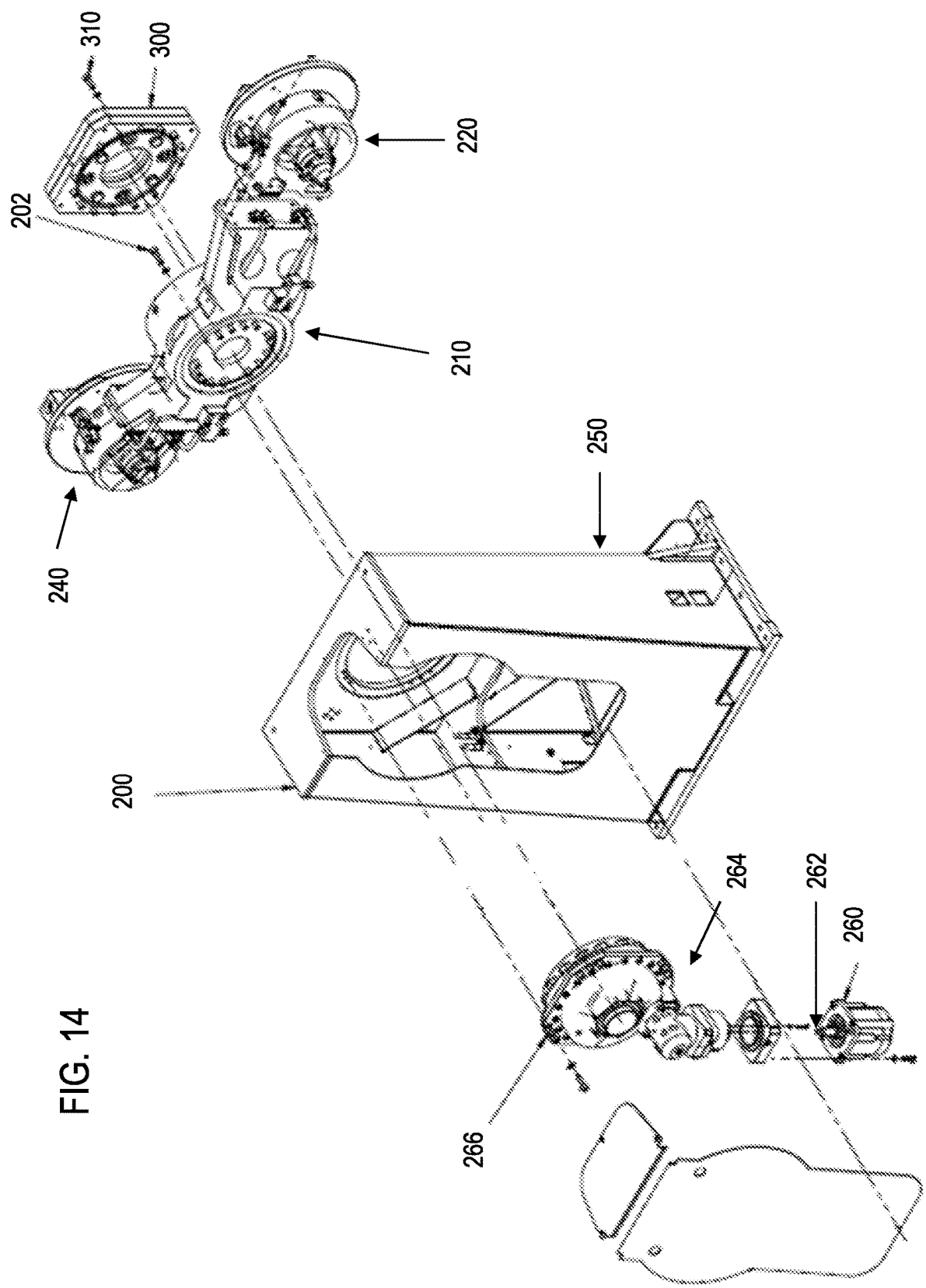
FIG. 14 is a top, front, left perspective, partially-exploded view of the headstock apparatus and the compliance assembly of the workpiece positioner assembly of FIG. 1.
Figure 15:
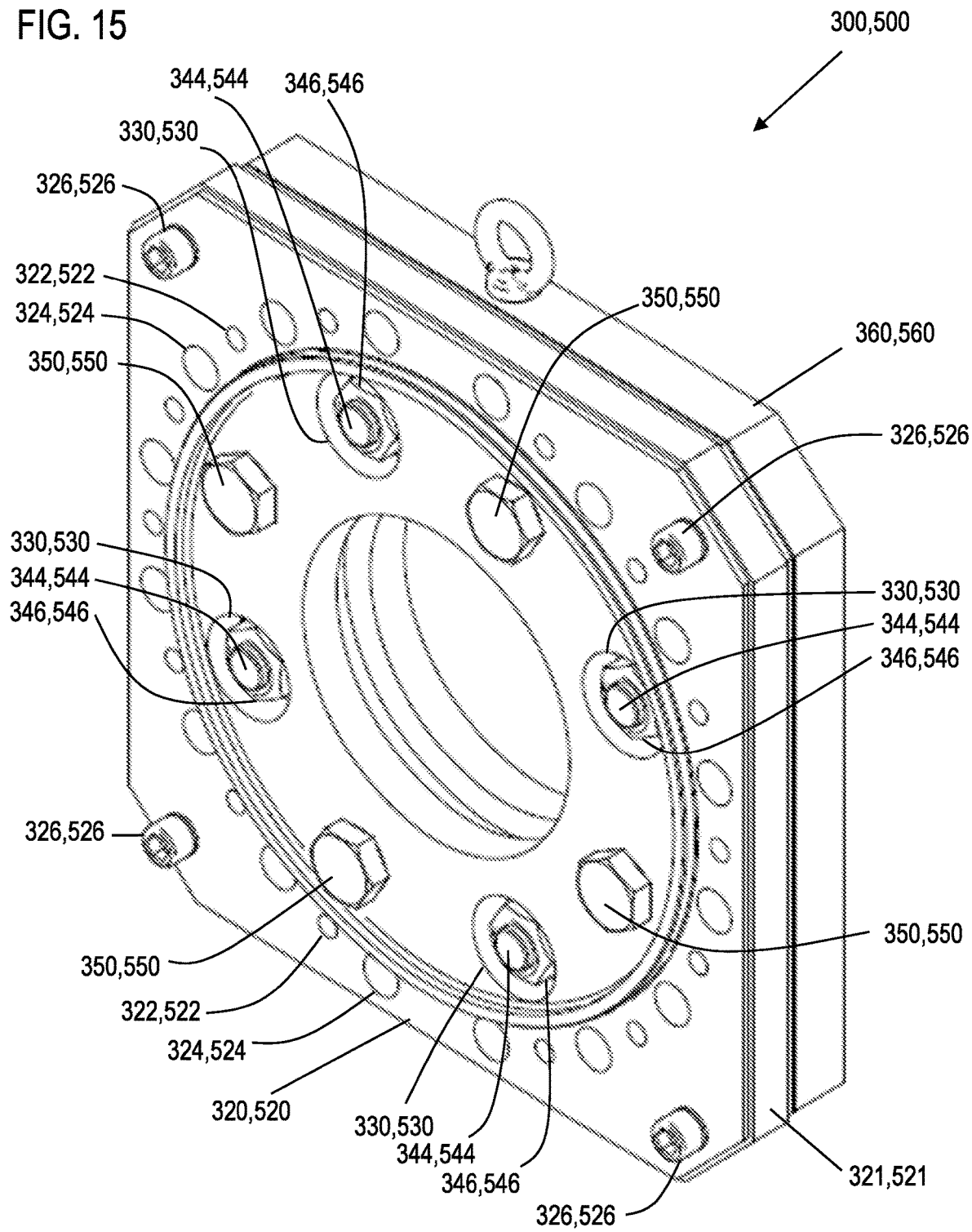
FIG. 15 is a top, front, right perspective view of a compliance assembly according to an embodiment of the present invention.
Figure 16:
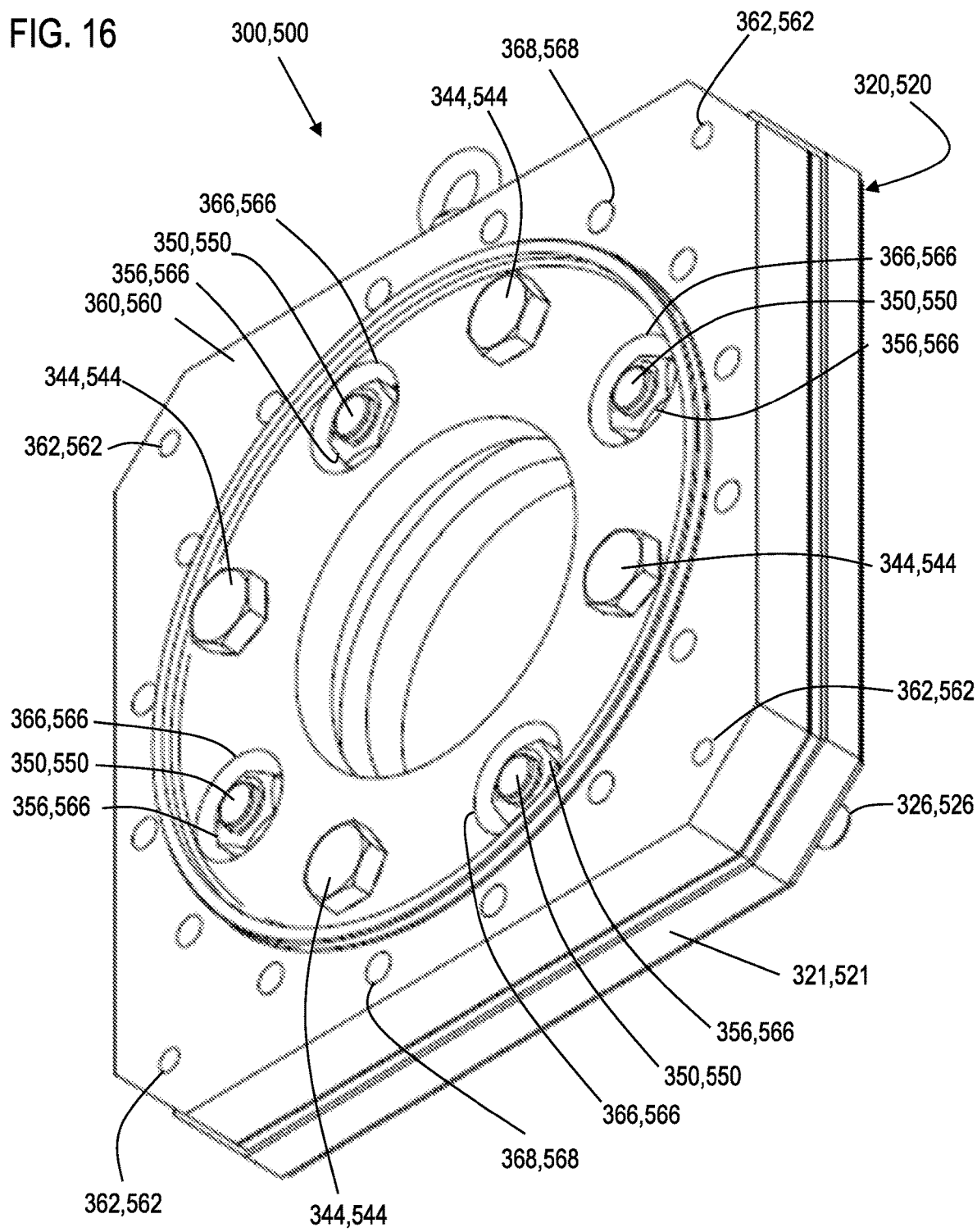
FIG. 16 is a bottom, rear, left perspective view of the compliance assembly of FIG. 15.
Figure 17:
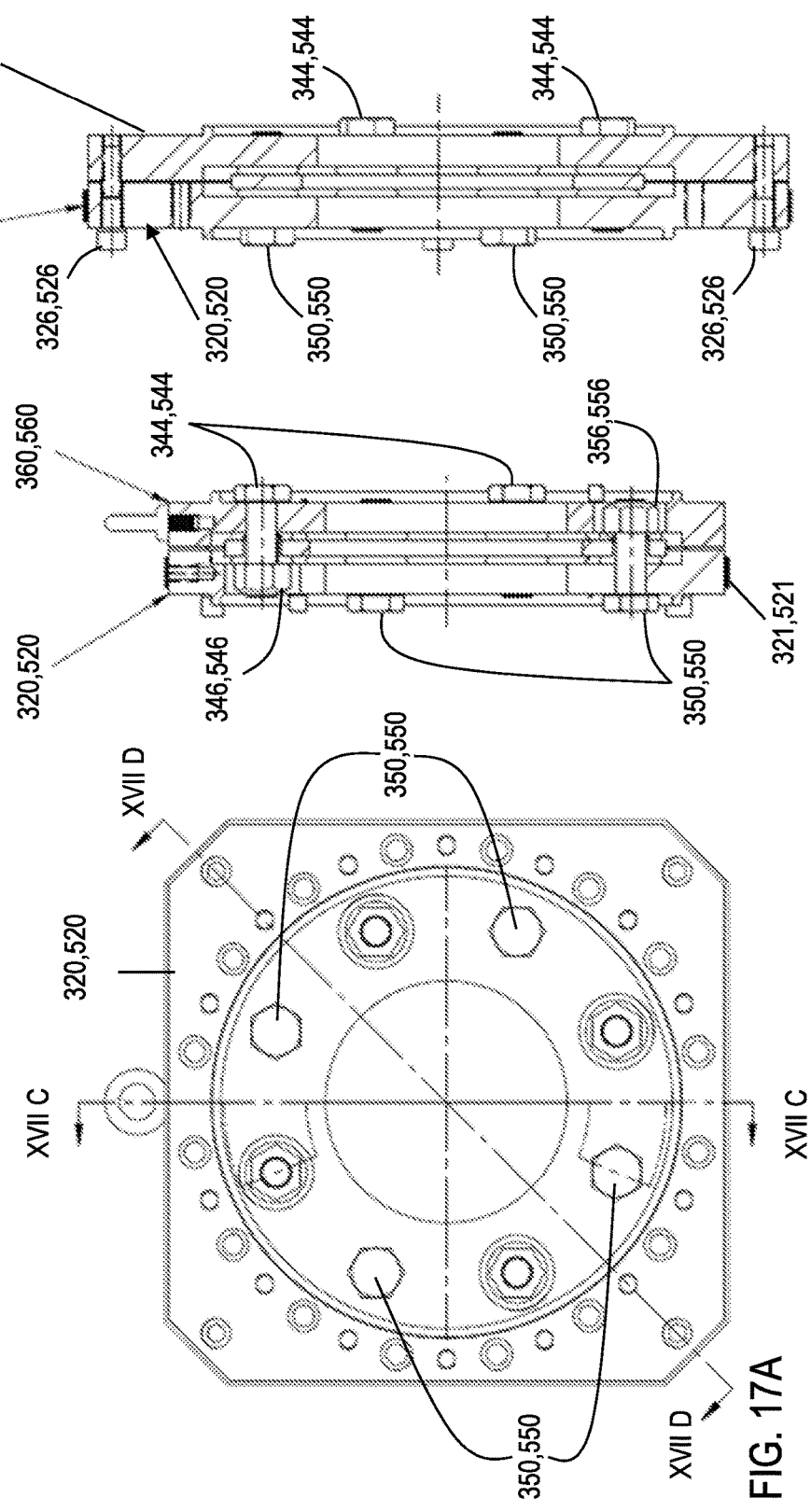
FIG. 17A is a front view of the compliance assembly of FIG. 15.
FIG. 17B is a top view of the compliance assembly of FIG. 15.
FIG. 17C is a cross-sectional view of the compliance assembly taken along lines XVII C-XVII C in FIG. 17A.
FIG. 17D is a cross-sectional view of the compliance assembly taken along line XVII D-XVII D in FIG. 17A.

The headstock apparatus 200 includes a drive assembly as shown in FIGS. 13 and 14. The headstock apparatus 200 has a motor 260 having an output shaft 262, as seen in FIGS. 13 and 14. The output shaft 262 drives an input gear assembly 264 that include bevel, spur, and helical gears. The output of input gear assembly 264 rotates the input of a first axis reduction assembly 266 which in turn drives the first axis of rotation A1. The motor 260 drives the headstock swing arm 210 about the first axis of rotation using the output shaft 262, the input gear assembly 264, and the first axis reduction assembly 266. The headstock swing arm 210 is mounted to the first axis reduction assembly 266 by screws 202, as can be seen in FIGS. 13 and 14.

Figure 8:
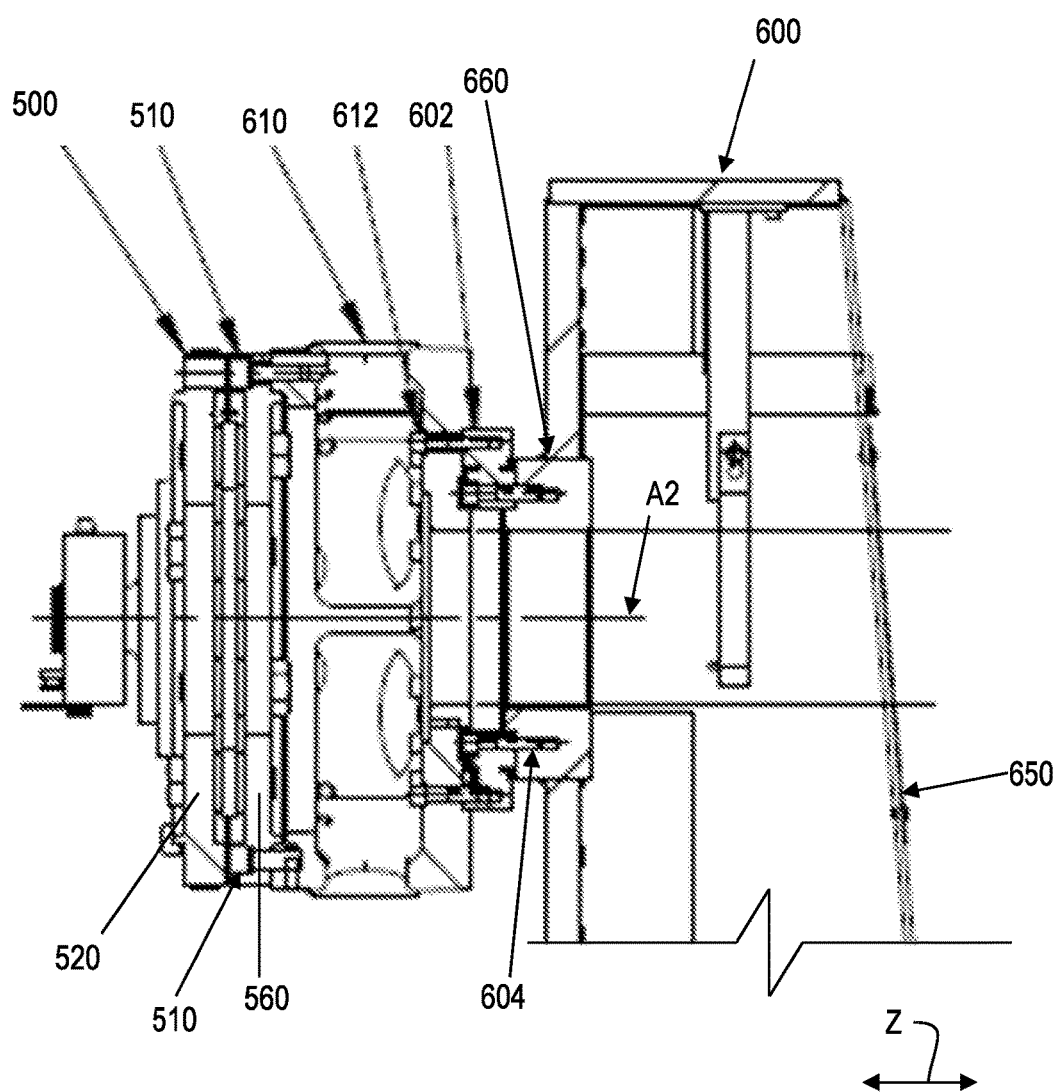
FIG. 8 is a partial cross-section view of the tailstock apparatus and the compliance assembly taken along line VIII-VIII in FIG. 7.
Figure 9:
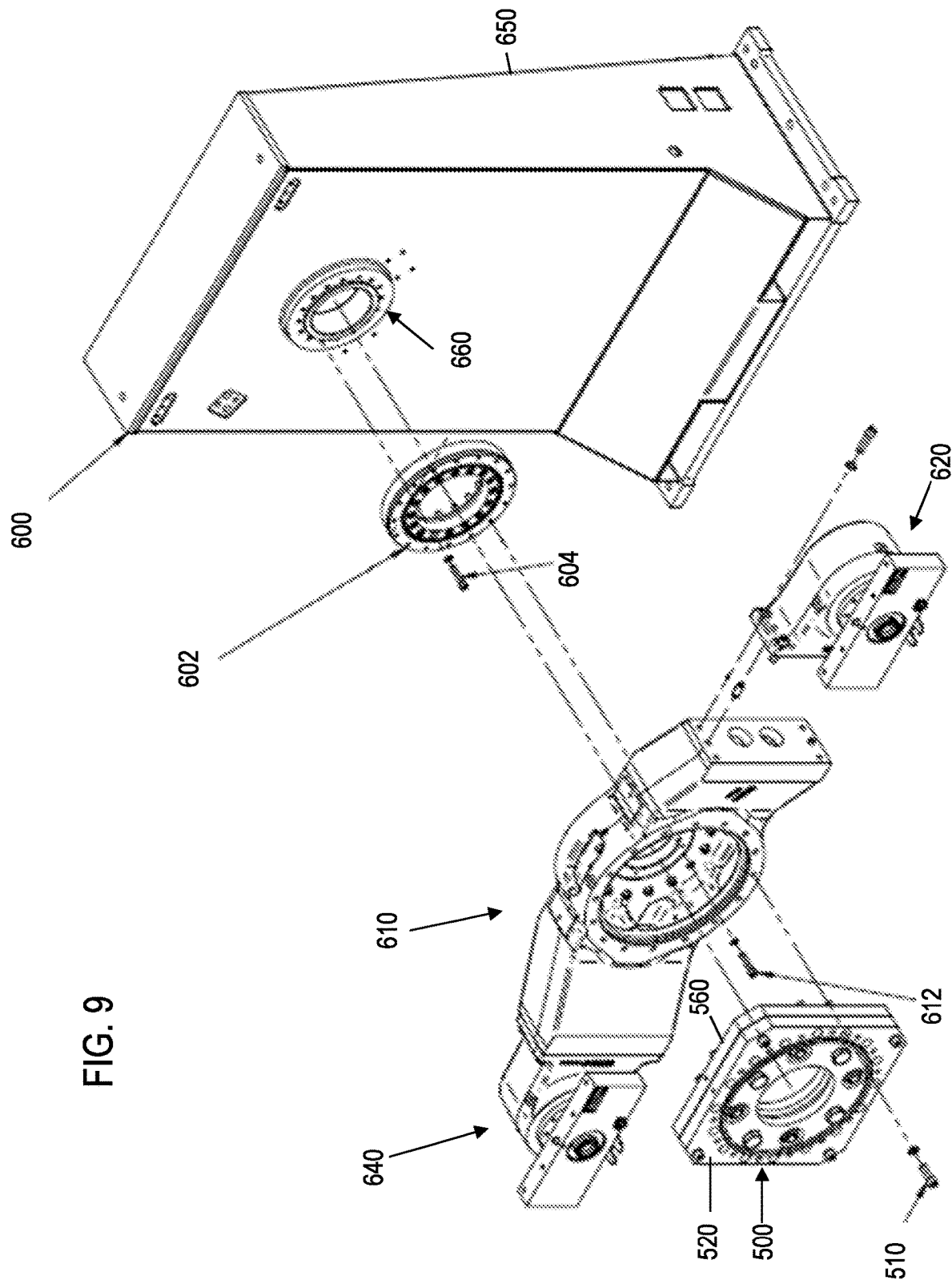
FIG. 9 is a top, front, left perspective, partially-exploded view of the tailstock apparatus and the compliance assembly of the workpiece positioner assembly of FIG. 1.
Figure 10:
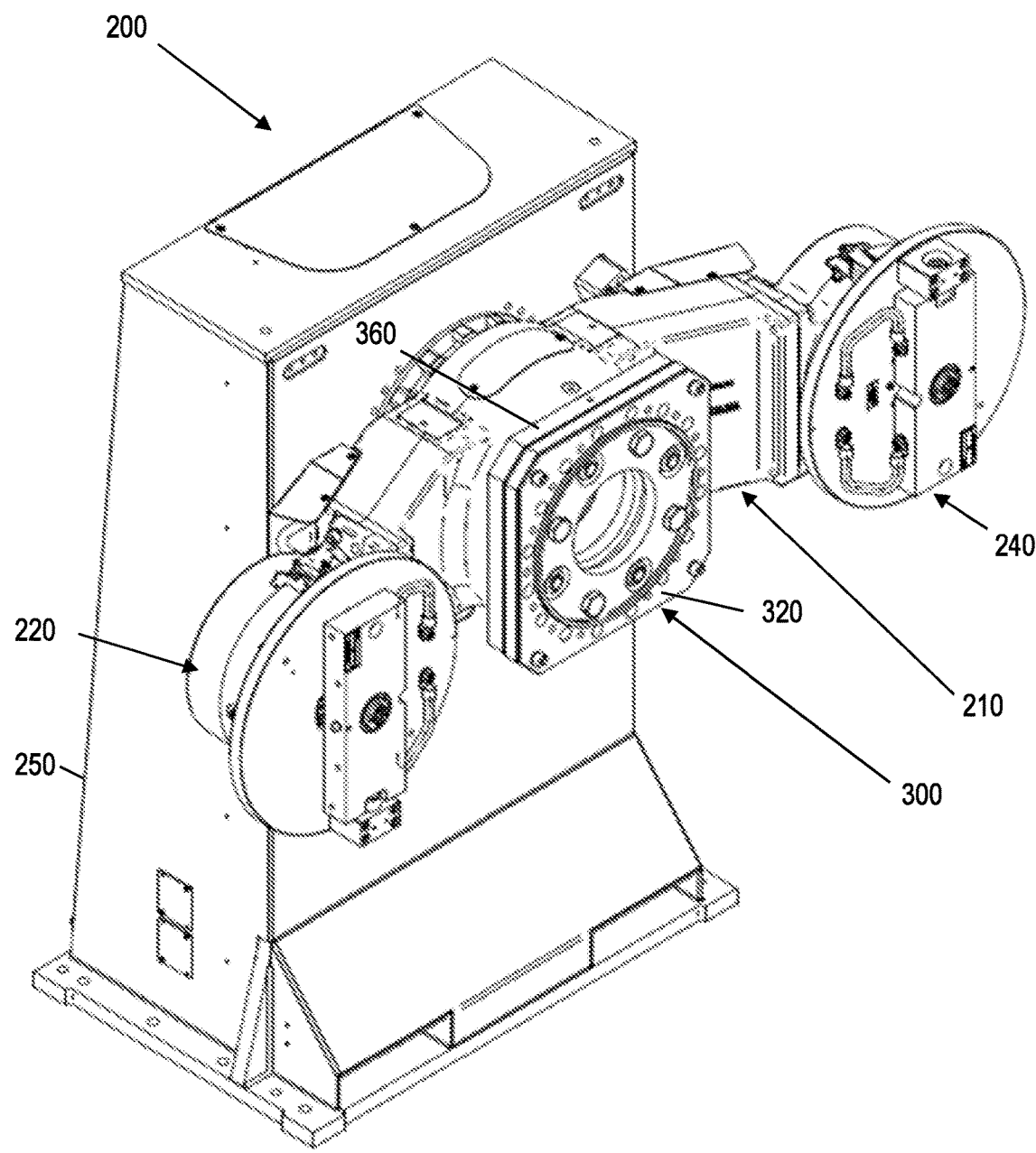
FIG. 10 is a top, front, right perspective view of a headstock apparatus and a compliance assembly of the workpiece positioner assembly of FIG. 1.
Figure 11:
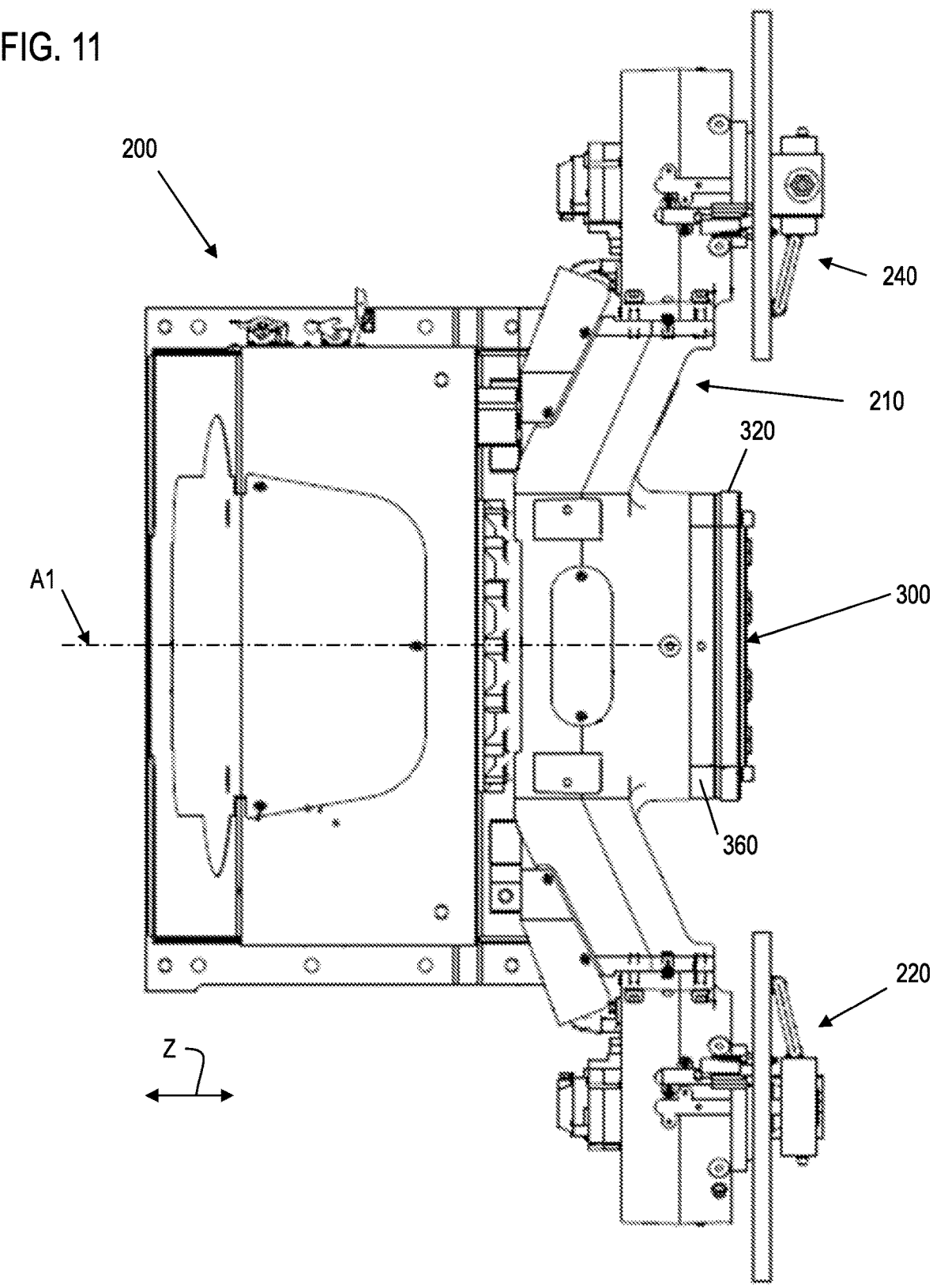
FIG. 11 is a top view of the headstock apparatus and the compliance assembly of the workpiece positioner assembly of FIG. 1.
Figure 12:
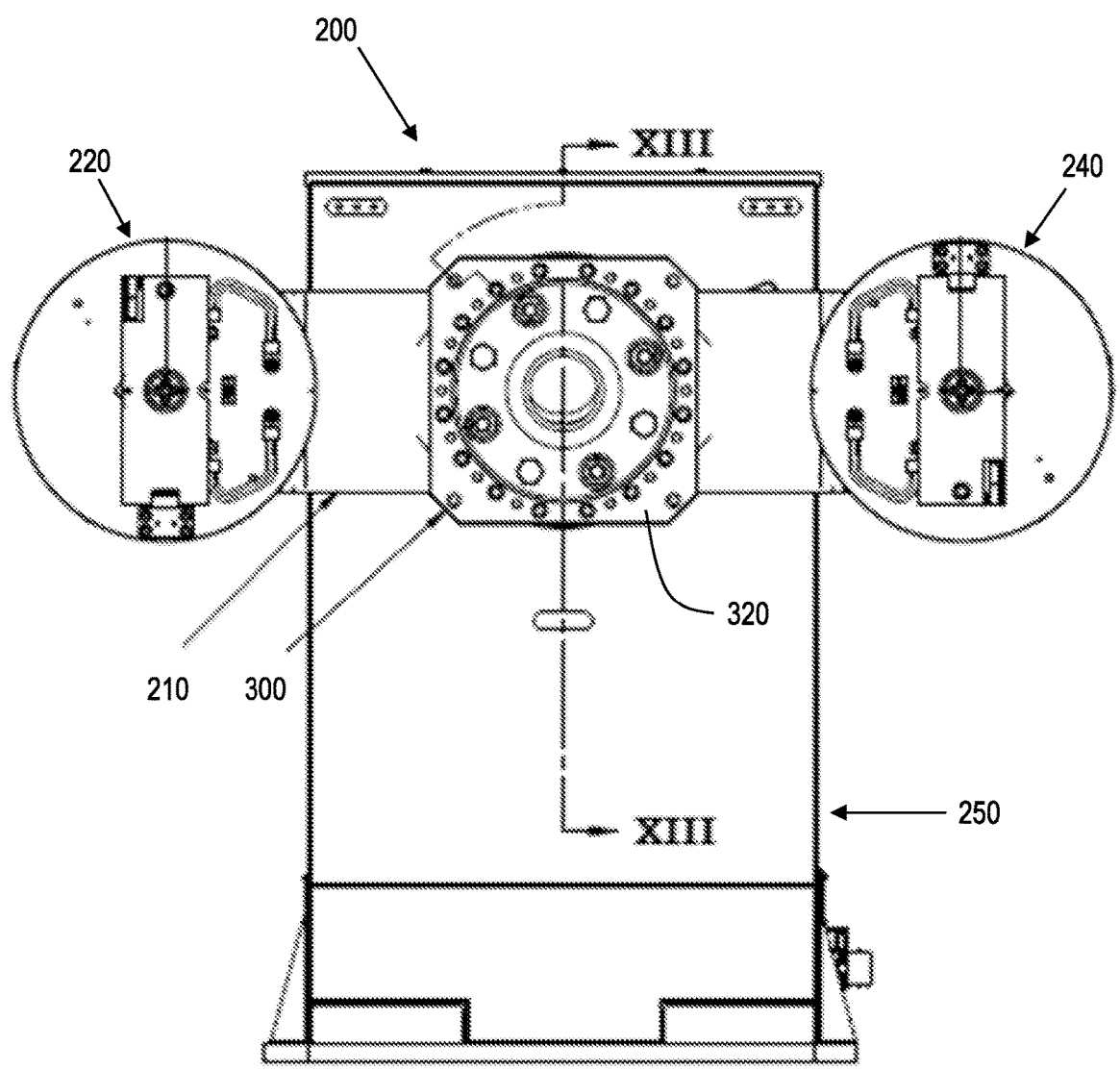
FIG. 12 is a right side view of the headstock apparatus and the compliance assembly of the workpiece positioner assembly of FIG. 1.

As shown, for example, in FIGS. 8 and 9, the tailstock swing arm 610 is mounted to an adapter plate 602 by screws 612, and the adapter plate 602 is mounted to a rotational bearing 660 by screws 604. The rotational bearing 660 is mounted to and supported by base or pedestal 650 of the tailstock apparatus 600.

The workpiece positioner assembly 100 including the compliance assemblies 300, 500 are advantageously used in low speed cycling applications. For example, low speed cycling applications in which the center beam 400 is rotated at low rotational speeds of less than or equal to 50 revolutions per minute.

FIGS. 15-18 depict an embodiment of a compliance assembly that corresponds to both the first compliance assembly 300 and the second compliance assembly 500. In the present embodiment, as both the first and second compliance assemblies 300, 500 have the same structures, FIGS. 15-18 depict an embodiment of both the first and second compliance assemblies 300, 500 with corresponding reference numerals for each assembly shown in these figures.

The first compliance assembly 300 includes a first beam-side coupling plate 320 rigidly connected to the beam 400 (as shown in FIGS. 1 and 3), a headstock apparatus-side coupling plate 360 rigidly connected to the headstock swing arm 210, and a first flexible coupling member 340. The first flexible coupling member 340 is coupled to the first beam-side coupling plate 320. The first flexible coupling member 340 is also coupled to the headstock apparatus-side coupling plate 360.

Figure 18:
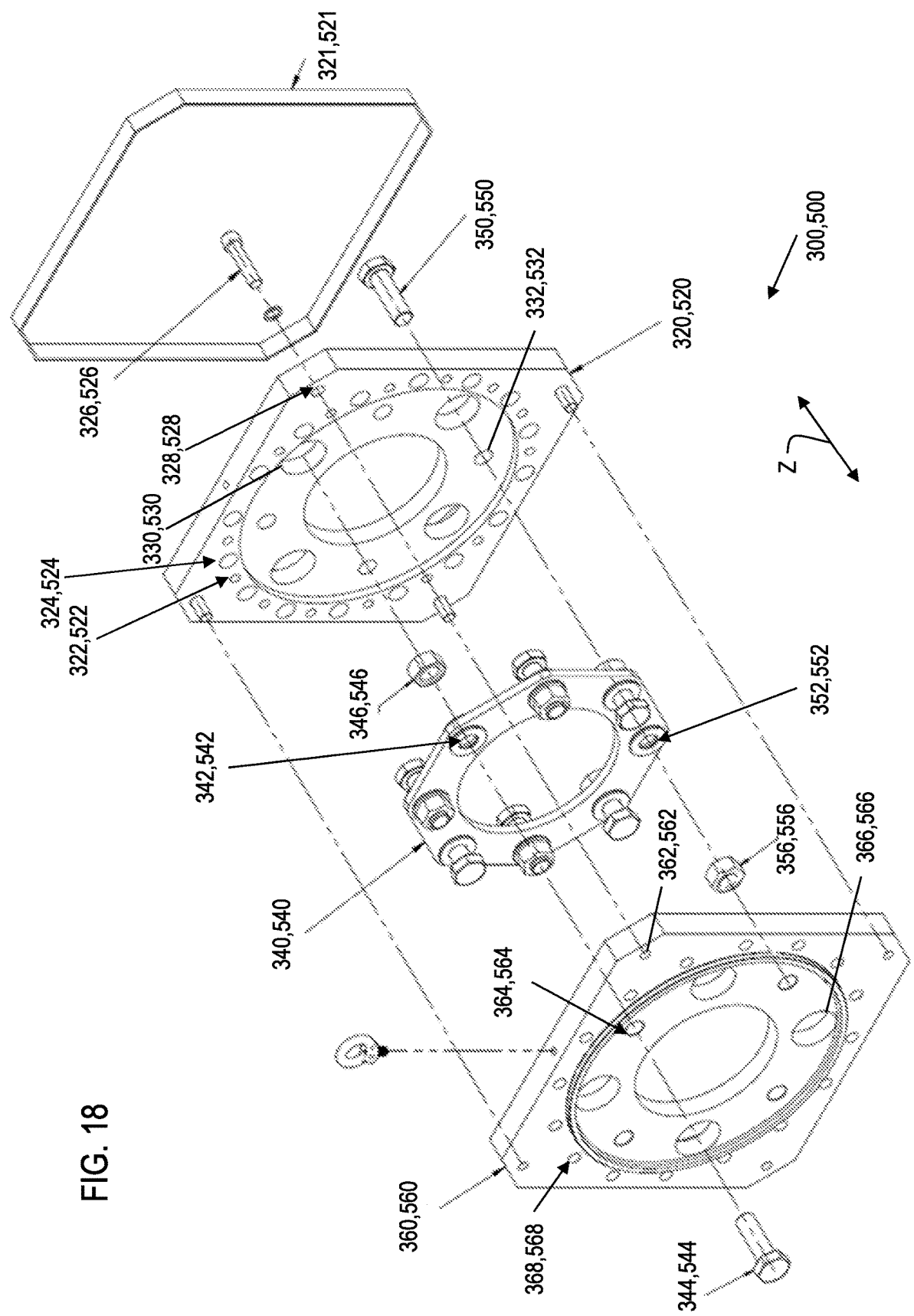
FIG. 18 is a top, rear, left, partially-exploded perspective view of the compliance assembly of FIG. 15.

The first flexible coupling member 340 has an annular shape, as can be seen in FIG. 18. The first flexible coupling member 340 has a planar shape when viewed in a direction perpendicular to the first axis of rotation A1, as can be seen, for example, in FIGS. 10, 11, 17C, 17D, and 18.

The first compliance assembly 300 further includes first rod members 350 circumferentially provided about the annular shape of the first flexible coupling member 340. In this embodiment, the first rod members 350 are bolts; however, other types of rod members and fasteners can be used. The first rod members 350 connect the first flexible coupling member 340 to the first beam-side coupling plate 320. The first compliance assembly 300 further includes second rod members 344 circumferentially provided about the annular shape of the first flexible coupling member 340. In this embodiment, the second rod members 344 are bolts; however, other types of rod members and fasteners can be used. The second rod members 344 connect the first flexible coupling member 340 to the headstock apparatus-side coupling plate 360. The first rod members 350 and the second rod members 344 are alternately provided about a circumference of the annular shape of the first flexible coupling member 340. The first rod members 350 and the second rod members 344 are evenly spaced from each other about the circumference of the annular shape of the first flexible coupling member 340.

The planar shape of the first flexible coupling member 340 allows for bending and flexing of the first flexible coupling member 340 when acted upon by forces transmitted from the first beam-side coupling plate 320 by one or more of the first rod members 350 and forces transmitted from the headstock apparatus-side coupling plate 360 by one or more of the second rod members 344.

The second compliance assembly 500 includes a second beam-side coupling plate 520 rigidly connected to the beam 400 (as shown in FIGS. 1 and 3), a tailstock apparatus-side coupling plate 560 rigidly connected to the tailstock swing arm 610, and a second flexible coupling member 540. The second flexible coupling member 540 is coupled to the second beam-side coupling plate 520. The second flexible coupling member 540 is coupled to the tailstock apparatus-side coupling plate 560.

The second flexible coupling member 540 has an annular shape, as can be seen in FIG. 18. The second flexible coupling member 540 has a planar shape when viewed in a direction perpendicular to the first axis of rotation A1, as can be seen, for example, in FIGS. 5, 6, 17C, 17D, and 18.

The second compliance assembly 500 further includes third rod members 550 circumferentially provided about the annular shape of the second flexible coupling member 540. In this embodiment, the third rod members 550 are bolts; however, other types of rod members and fasteners can be used. The third rod members 550 connect the second flexible coupling member 540 to the second beam-side coupling plate 520. The second compliance assembly 500 further includes fourth rod members 544 circumferentially provided about the annular shape of the second flexible coupling member 540. In this embodiment, the fourth rod members 544 are bolts; however, other types of rod members and fasteners can be used. The fourth rod members 544 connect the second flexible coupling member 540 to the tailstock apparatus-side coupling plate 560. The third rod members 550 and the fourth rod members 544 are alternately provided about a circumference of the annular shape of the second flexible coupling member 540. The third rod members 550 and the fourth rod members 544 are evenly spaced from each other about the circumference of the annular shape of the second flexible coupling member 540.

The planar shape of the second flexible coupling member 540 allows for bending and flexing of the second flexible coupling member 540 when acted upon by forces transmitted from the second beam-side coupling plate 520 by one or more of the third rod members 550 and forces transmitted from the tailstock apparatus-side coupling plate 560 by one or more of the fourth rod members 544.

Figure 2:
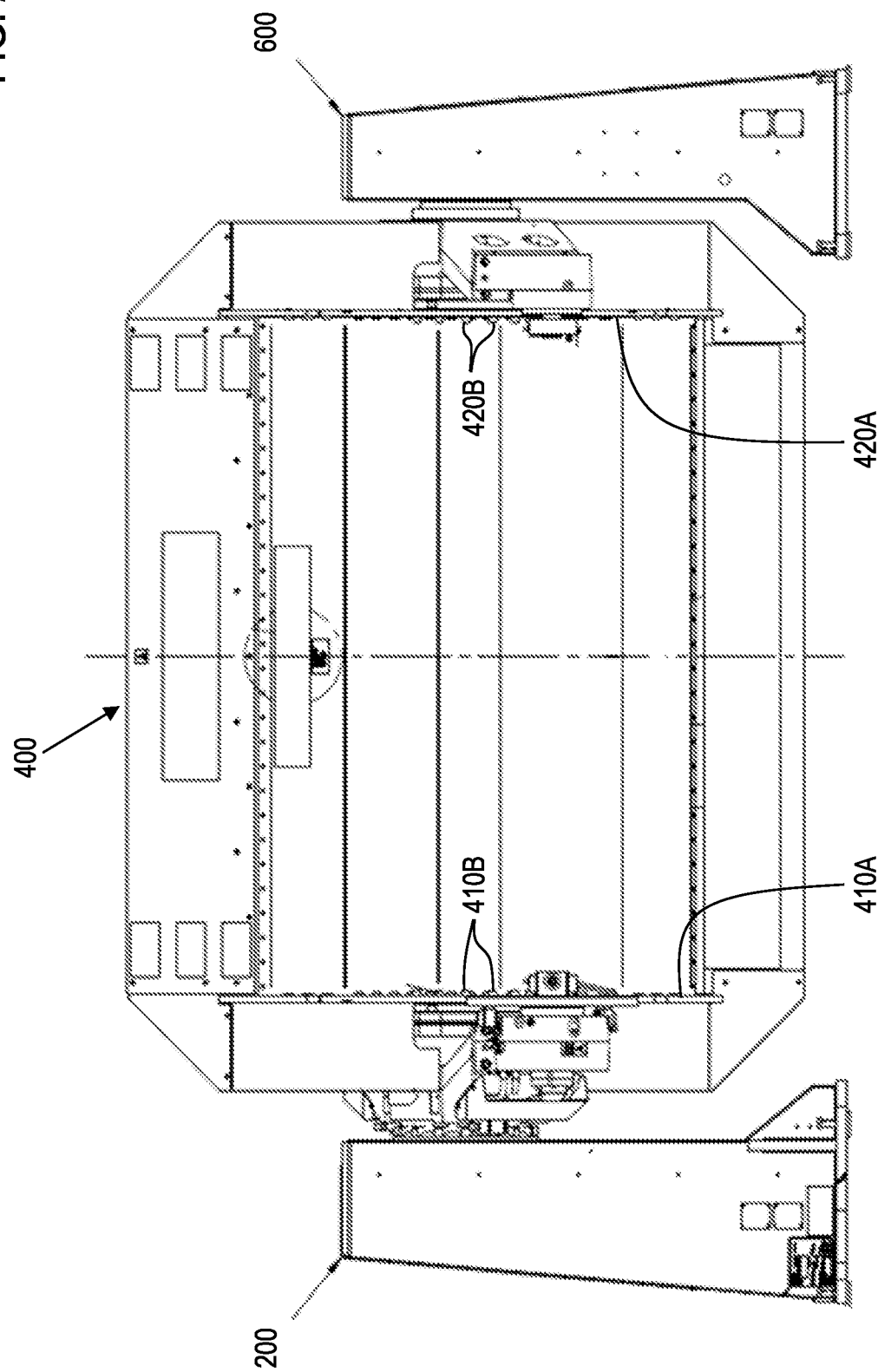
FIG. 2 is a front view of the workpiece positioner assembly of FIG. 1.

The center beam 400 has mounting plates 410A, 410B on ends thereof, as can be seen in FIGS. 1-3. Holes 322 in the beam-side plate 320 allow screws 420A to extend through the mounting plate 410A of the center beam 400 and into holes 322 to join beam-side plate 320 to a first end of the center beam 400. Holes 522 allow screws 420B to extend through the mounting plate 410B of the center beam 400 and into holes 522 to join beam-side plate 520 to a second end of the center beam 400.

Holes 324 in beam-side plate 320 allow screws 310 (see, e.g., FIGS. 13 and 14) to extend therethrough (the screws 310 sitting within but not joining to holes 324) and to extend through holes 368 in headstock apparatus-side coupling plate 360 to join plate 360 to the headstock apparatus 200 via holes 368. Holes 524 in beam-side plate 520 allow screws 510 (see, e.g., FIGS. 8 and 9) to extend therethrough (the screws 510 sitting within but not joining to holes 524) and to extend through holes 568 in tailstock apparatus-side coupling plate 560 to join plate 560 to the tailstock apparatus 600 via holes 568.

Screws 326, 526 extend through holes 328, 528 in the four corners of beam-side plates 320, 520 and extend into and threadedly engage with holes 362, 562 in headstock apparatus-side plate 360, tailstock apparatus-side plate 560, respectively. The screws 326, 526 are used for assembly and then the screws 326, 526 are used for compressing the compliance assemblies 300, 500 to prevent damage during shipping. The screws 326, 526 are removed for normal operation.

The flexible coupling member 340 has four circumferentially evenly spaced holes 342 and four circumferentially evenly spaced holes 352. The flexible coupling member 540 has four circumferentially evenly spaced holes 542 and four circumferentially evenly spaced holes 552.

Four evenly spaced bolts 344, 544 (please note that for simplicity of drawings three of these bolts are shown on the members 340, 540 in FIG. 18, but would instead be mounted in the same manner as the labeled bolt 344, 544 in FIG. 18) extend through four evenly spaced holes 364, 564 in plates 360, 560, and through holes 342, 542 in members 340, 540, and into enlarged four evenly spaced holes 330, 530 in plates 320, 520. Nuts 346, 546 are threadedly engaged to bolts 344, 544 to join plates 360, 560 to members 340, 540. The nuts 346, 546 and the ends of bolts 344, 544 sit within but do not join to enlarged holes 330, 530.

Four evenly spaced bolts 350, 550 (please note that for simplicity of drawings three of these bolts are shown on the members 340, 540 in FIG. 18, but would instead be mounted in the same manner as the labeled bolt 350, 550 in FIG. 18) extend through holes 332, 532 in plates 320, 520, and through holes 352, 552 in members 340, 540, and into enlarged holes 366, 566 in plates 360, 560. Nuts 366, 566 are threadedly engaged to bolts 350, 550 to join plates 320, 520 to members 340, 540. The nuts 356, 556 and the ends of bolts 350, 550 sit within but do not join to enlarged holes 366, 566.

Thus, the headstock apparatus-side coupling plate 360 provides a rigid connection between the headstock swing arm 210 and flexible coupling member 340. And, the beam-side plate 320 provides a rigid connection between the flexible coupling member 340 and the center beam 400. The flexible coupling member 340 is flexible such that misalignment between the first axis of rotation A1 of the headstock swing arm 210 and the third axis of rotation A3 of the center beam 400 will cause flexing of the flexible coupling member 340.

In addition, the tailstock apparatus-side coupling plate 560 provides a rigid connection between the tailstock swing arm 610 and flexible coupling member 540. And, the beam-side plate 520 provides a rigid connection between the flexible coupling member 540 and the center beam 400. The flexible coupling member 540 is flexible such that misalignment between the second axis of rotation A2 of the tailstock swing arm 610 and the third axis of rotation A3 of the center beam 400 will cause flexing of the flexible coupling member 540.

The compliance assemblies 300, 500 are torsionally stiff, but allow axial flexing. The compliance assemblies 300, 500 prevent material fatigue of other components of the workpiece positioner assembly. The compliance assemblies 300, 500 save space (i.e., are smaller in size) and less costly than other alternatives.

It is noted that, while the embodiment shown in FIG. 18 includes four evenly spaced bolts/nuts and associated holes joining plates 320, 520 to members 340, 540, and four evenly spaced bolts/nuts and associated holes joining plates 360, 560 to members 340, 540, different numbers of bolts/nuts/holes can be utilized, such as three, five, six, seven, eight, nine, ten, etc. It is preferable that the bolts/nuts/holes are evenly spaced about a center of the first compliance assembly 300 and the second compliance assembly 500; however, uneven spacing could also be used.

Seals 321, 521 are provided to prevent weld spatter etc. from entering the device.

Figure 19:
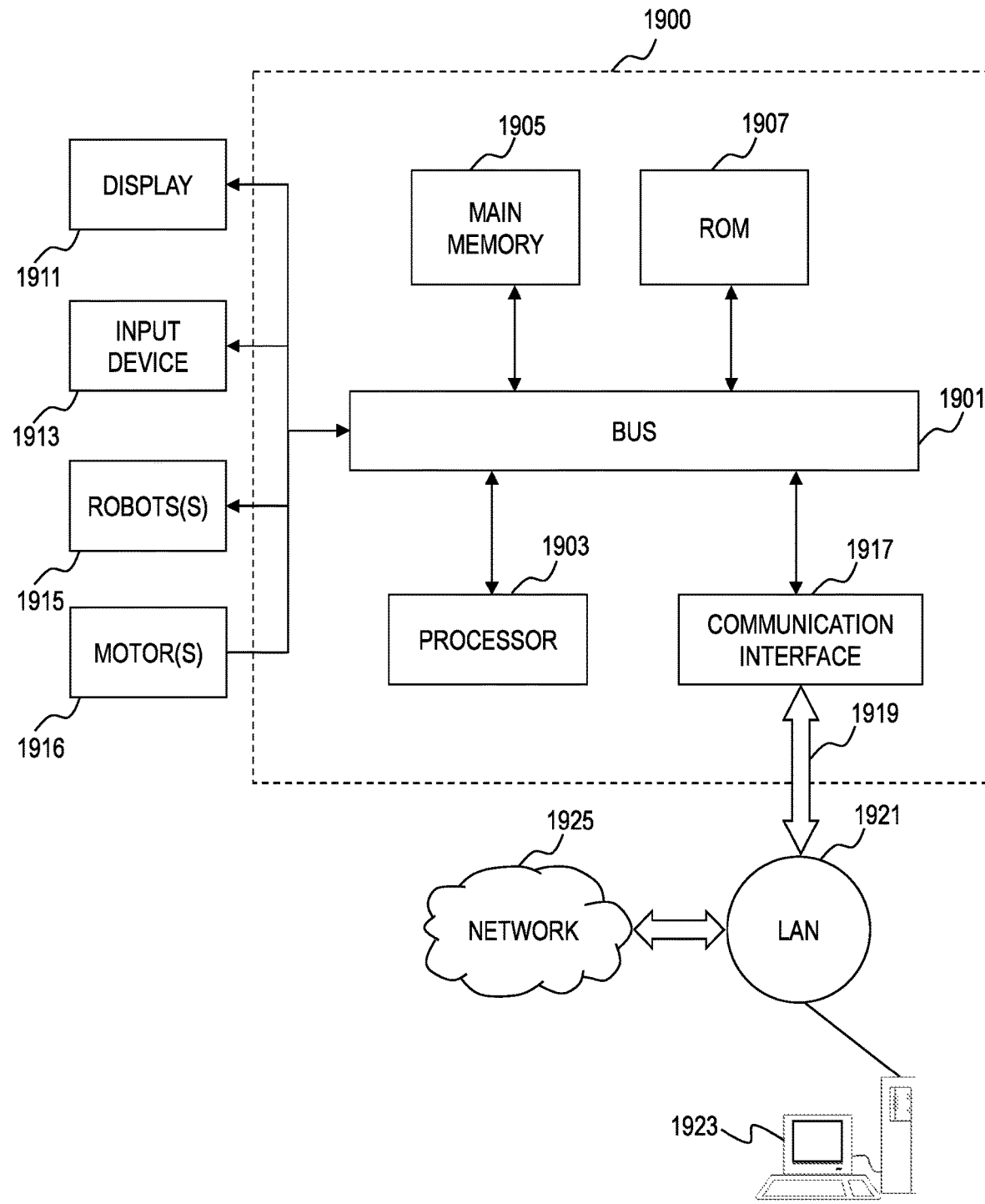
FIG. 19 illustrates an embodiment of a computer with which the workpiece positioner assembly according to an embodiment of the invention may be implemented.

FIG. 19 illustrates an embodiment of a computer 1900 with which an embodiment of the invention may be implemented. Although computer 1900 is depicted with respect to a particular device or equipment, it is contemplated that other devices or equipment (e.g., network elements, servers, etc.) within FIG. 19 can deploy the illustrated hardware and components of system 1900. The computer 1900 is programmed (e.g., via computer program code or instructions) to provide the functionality described herein and includes a communication mechanism such as a bus 1901 for passing information between other internal and external components of the computer system 1900. One or more processors 1903 for processing information are coupled with the bus 1901 to perform a set of operations on information as specified by computer program code.

The computer 1900 also includes a memory 1905 coupled to bus 1901. The memory 1905, such as a random access memory (RAM) or other dynamic storage device, stores information including processor instructions. The memory 1905 is also used by the processor 1903 to store temporary values during execution of processor instructions. The computer system 1900 also includes a read only memory (ROM) 1907 or other static storage device coupled to the bus 1901 for storing static information, including instructions, that is not changed by the computer system 1900. The computer 1900 includes a communication interface 1917 that allows the computer 1900 to communicate with other devices or equipment (e.g., network elements, servers, etc.)

Information, including user input instructions, is provided to the bus 1901 for use by the processor 1903 from a user interface including a display 1911 and an input device 1913, such as a keyboard containing alphanumeric keys operated by a human user, a pointing device (such as a mouse or a trackball or cursor direction keys).

One or more robots 1915 and motors 1916 (e.g., motor 260) can communicate with the processor 1903 via the bus 1901 in order to send and receive data, operating instructions/commands, or other information therebetween. The processor 1903 can control operation of the one or more robots 1915 and motors 1916 using operating instructions/commands in order to control movement of the robots 1915 and/or rotation (e.g., start, stop, direction (e.g., clockwise, counterclockwise), speed, etc.) of an output shaft motors 1916.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A workpiece positioner assembly comprising:
    a headstock apparatus including a motor and a headstock swing arm rotatably supported on the headstock apparatus, the headstock swing arm being configured to be rotated by the motor;
    a tailstock apparatus including a tailstock swing arm rotatably supported on the tailstock apparatus, the tailstock swing arm and the headstock swing arm being configured to support a workpiece;
    a beam coupled to the headstock swing arm and to the tailstock swing arm to transmit rotation of the headstock swing arm to the tailstock swing arm; and
    a compliance assembly including a flexible coupling member provided between at least one of
        the headstock swing arm and the beam to allow flexing of the flexible coupling member with respect to fasteners to enable relative movement between the headstock swing arm and the beam, and
        the tailstock swing arm and the beam to allow flexing of the flexible coupling member with respect to fasteners to enable relative movement between the tailstock swing arm and the beam.

2. The workpiece positioner assembly according to claim 1, wherein
    the compliance assembly is provided between the headstock swing arm and the beam, and
    the relative movement includes flexing pitch movement, flexing yaw movement, and flexing axial movements relative to an axis of rotation of the headstock swing arm.

3. The workpiece positioner assembly according to claim 2, wherein
    the compliance assembly includes:
        a beam-side coupling plate rigidly connected to the beam;
        a headstock apparatus-side coupling plate rigidly connected to the headstock swing arm; and
        the flexible coupling member coupled to the beam-side coupling plate, the flexible coupling member being coupled to the headstock apparatus-side coupling plate.

4. The workpiece positioner assembly according to claim 3, wherein
    the flexible coupling member having an annular shape, and
    the fasteners include:
        first rod members circumferentially provided about the annular shape of the flexible coupling member, the first rod members connecting the flexible coupling member to the beam-side coupling plate; and
        second rod members circumferentially provided about the annular shape of the flexible coupling member, the second rod members connecting the flexible coupling member to the headstock apparatus-side coupling plate.

5. The workpiece positioner assembly according to claim 4, wherein
    the flexible coupling member has a planar shape when viewed in a direction perpendicular to the axis of rotation.

6. The workpiece positioner assembly according to claim 1, wherein
    the compliance assembly is provided between the tailstock swing arm and the beam, and
    the relative movement includes flexing pitch movement, flexing yaw movement, and flexing axial movements relative to an axis of rotation of the tailstock swing arm.

7. The workpiece positioner assembly according to claim 6, wherein
    the compliance assembly includes:
        a beam-side coupling plate rigidly connected to the beam;
        a tailstock apparatus-side coupling plate rigidly connected to the tailstock swing arm; and the flexible coupling member coupled to the beam-side coupling plate, the flexible coupling member being coupled to the tailstock apparatus-side coupling plate.

8. The workpiece positioner assembly according to claim 7, wherein
the flexible coupling member having an annular shape, and
the fasteners include:
third rod members circumferentially provided about the annular shape of the flexible coupling member, the third rod members connecting the flexible coupling member to the beam-side coupling plate; and
fourth rod members circumferentially provided about the annular shape of the flexible coupling member, the fourth rod members connecting the flexible coupling member to the tailstock apparatus-side coupling plate.

9. The workpiece positioner assembly according to claim 8, wherein
the first flexible coupling member has a planar shape when viewed in a direction perpendicular to the axis of rotation, and
the second flexible coupling member has a planar shape when viewed in the direction perpendicular to the axis of rotation.

10. The workpiece positioner assembly according to claim 1, wherein
a first compliance assembly is provided between the headstock swing arm and the beam to enable relative movement including flexing pitch movement, flexing yaw movement, and flexing axial movements relative to an axis of rotation of the headstock swing arm, and
a second compliance assembly is provided between the tailstock swing arm and the beam to enable relative movement including flexing pitch movement, flexing yaw movement, and flexing axial movements relative to an axis of rotation of the tailstock swing arm.

11. The workpiece positioner assembly comprising:
a headstock apparatus including a motor and a headstock swing arm rotatably supported on the headstock apparatus, the headstock swing arm being configured to be rotated by the motor;
a tailstock apparatus including a tailstock swing arm rotatably supported on the tailstock apparatus, the tailstock swing arm and the headstock swing arm being configured to support a workpiece;
a beam coupled to the headstock swing arm and to the tailstock swing arm to transmit rotation of the headstock swing arm to the tailstock swing arm;
a first compliance assembly including a first flexible coupling member provided between the headstock swing arm and the beam to allow flexing of the first flexible coupling member with respect to first fasteners to enable relative movement between the headstock swing arm and the beam; and
a second compliance assembly including a second flexible coupling member provided between the tailstock swing arm and the beam to allow flexing of the second flexible coupling member with respect to second fasteners to enable relative movement between the tailstock swing arm and the beam, wherein
the first compliance assembly includes:
a first beam-side coupling plate rigidly connected to the beam;
a headstock apparatus-side coupling plate rigidly connected to the headstock swing arm; and
the first flexible coupling member coupled to the first beam-side coupling plate, the first flexible coupling member being coupled to the headstock apparatus-side coupling plate, and
the second compliance assembly includes:
a second beam-side coupling plate rigidly connected to the beam;
a tailstock apparatus-side coupling plate rigidly connected to the tailstock swing arm; and
the second flexible coupling member coupled to the second beam-side coupling plate, the second flexible coupling member being coupled to the tailstock apparatus-side coupling plate.

12. The workpiece positioner assembly according to claim 11, wherein
the first flexible coupling member having an annular shape,
the first fasteners include:
first rod members circumferentially provided about the annular shape of the first flexible coupling member, the first rod members connecting the first flexible coupling member to the first beam-side coupling plate; and
second rod members circumferentially provided about the annular shape of the first flexible coupling member, the second rod members connecting the first flexible coupling member to the headstock apparatus-side coupling plate,
the second flexible coupling member having an annular shape, and
the second fasteners include:
third rod members circumferentially provided about the annular shape of the second flexible coupling member, the third rod members connecting the second flexible coupling member to the second beam-side coupling plate; and
fourth rod members circumferentially provided about the annular shape of the second flexible coupling member, the fourth rod members connecting the second flexible coupling member to the tailstock apparatus-side coupling plate.

13. The workpiece positioner assembly according to claim 12, wherein
the first rod members and the second rod members are alternately provided about a circumference of the annular shape of the first flexible coupling member, and
the third rod members and the fourth rod members are alternately provided about a circumference of the annular shape of the second flexible coupling member.

14. The workpiece positioner assembly according to claim 12, wherein
the first rod members and the second rod members are evenly spaced from each other about the circumference of the annular shape of the first flexible coupling member, and
the third rod members and the fourth rod members are evenly spaced from each other about the circumference of the annular shape of the second flexible coupling member.

15. The workpiece positioner assembly according to claim 12, wherein
the first flexible coupling member has a planar shape when viewed in a direction perpendicular to the axis of rotation, and
the second flexible coupling member has a planar shape when viewed in the direction perpendicular to the axis of rotation.

16. The workpiece positioner assembly according to claim 1, wherein
- the headstock swing arm has a first headstock workpiece mounting module provided at a location radially spaced apart from an axis of rotation of the headstock swing arm,
- the tailstock swing arm has a first tailstock workpiece mounting module provided at a location radially spaced apart from an axis of rotation of the tailstock swing arm, and
- the first headstock workpiece mounting module and the first tailstock workpiece mounting module being configured to support the workpiece.

17. The workpiece positioner assembly according to claim 16, wherein
- the headstock swing arm has a second headstock workpiece mounting module provided at a location radially spaced apart from the axis of rotation of the headstock swing arm,
- the tailstock swing arm has a second tailstock workpiece mounting module provided at a location radially spaced apart from the axis of rotation of the tailstock swing arm, and
- the second headstock workpiece mounting module and the second tailstock workpiece mounting module being configured to support another workpiece.

18. The workpiece positioner assembly according to claim 16, wherein
- the beam is configured as a shield to separate a first area between the first headstock workpiece mounting module and the first tailstock workpiece mounting module from a second area between the second headstock workpiece mounting module and the second tailstock workpiece mounting module.

19. The workpiece positioner assembly according to claim 1, wherein
- the headstock swing arm has a first axis of rotation as rotatably supported by the headstock apparatus,
- the tailstock swing arm has a second axis of rotation as rotatably supported by the tailstock apparatus, and
- the beam has a longitudinal axis that is not aligned with one or both of the first axis of rotation and the second axis of rotation.

20. The workpiece positioner assembly according to claim 19, wherein
- the compliance assembly provides stiff torque transmission from the headstock swing arm to the tailstock swing arm via the beam by enabling relative movement between the longitudinal axis and the first axis of rotation or the longitudinal axis and the second axis of rotation.

* * * * *